(12) United States Patent
Hatori et al.

(10) Patent No.: US 8,518,840 B2
(45) Date of Patent: Aug. 27, 2013

(54) SYNTHETIC RESIN LEATHER

(75) Inventors: Yoshinari Hatori, Shizuoka (JP); Shin Nakaya, Shizuoka (JP); Akira Nagata, Shizuoka (JP); Yasuhiro Tanaka, Shizuoka (JP); Kazuomi Ishimaru, Shizuoka (JP); Yoshiaki Hirai, Shizuoka (JP); Yasuki Kamo, Tokyo (JP)

(73) Assignee: Okamoto Industries, Inc. (JP)

( * ) Notice: Subject to any disclaimer, the term of this patent is extended or adjusted under 35 U.S.C. 154(b) by 718 days.

(21) Appl. No.: 11/722,365

(22) PCT Filed: Dec. 24, 2004

(86) PCT No.: PCT/JP2004/019302
§ 371 (c)(1),
(2), (4) Date: Dec. 7, 2009

(87) PCT Pub. No.: WO2006/067848
PCT Pub. Date: Jun. 29, 2006

(65) Prior Publication Data
US 2010/0075559 A1    Mar. 25, 2010

(51) Int. Cl.
*D04B 1/00* (2006.01)
*D04B 1/18* (2006.01)
*D04B 1/20* (2006.01)
*D04B 7/04* (2006.01)
*B32B 5/18* (2006.01)

(52) U.S. Cl.
USPC ........... 442/304; 442/306; 442/308; 442/312; 442/315; 428/904; 66/196

(58) Field of Classification Search
USPC .................... 442/304–314; 66/198; 428/904
See application file for complete search history.

(56) References Cited

U.S. PATENT DOCUMENTS

| 5,298,303 A | * | 3/1994 | Kerr et al. | 428/35.7 |
| 6,863,953 B2 | * | 3/2005 | Mori et al. | 428/141 |
| 2003/0158343 A1 | | 8/2003 | Kijima | |
| 2003/0166749 A1 | * | 9/2003 | Eckstein et al. | 524/101 |
| 2005/0261427 A1 | * | 11/2005 | Saito | 525/88 |

FOREIGN PATENT DOCUMENTS

| DE | 2432939 A1 | 1/1976 |
| EP | 1152079 A1 | 11/2001 |
| JP | 11-335978 | * 12/1999 |
| JP | H11-335978 | 12/1999 |
| JP | 2002-339200 | 11/2002 |
| KR | 20010100992 A | 11/2001 |
| WO | 0029653 A1 | 5/2000 |
| WO | 0200425 A1 | 1/2002 |

OTHER PUBLICATIONS

European Search Report; Application No. EP 04 80 7659; Jun. 16, 2009; 2 pages.

* cited by examiner

*Primary Examiner* — Jennifer A Steele
(74) *Attorney, Agent, or Firm* — St. Onge Steward Johnston & Reens LLC

(57) ABSTRACT

A synthetic resin leather has a substrate and a synthetic resin layer attached to the substrate. The substrate is a both sides cross-knitted fabric and is prepared by cross-knitting a first yarn with 10 to 40 in count including single spun or mixed spun fibers made of rayon, cotton, polyester, nylon, acryl, or urethane and a second yarn with 50 to 300 in denier including crimpy long fiber filaments, thermoplastic elastomer long fiber filaments or polyurethane long fiber filaments; and knitting the both-sided cross-knitted fabric so loops made of the first yarn and loops made of the second yarn are formed on the front and rear sides of the substrate and are in alternating positions on the front side as compared to the rear side; and, on each side of the substrate, loops of the first and second yarns are formed in alternating positions in longitudinal and transverse directions.

18 Claims, 5 Drawing Sheets

(i)

(ii)

SYNTHETIC RESIN LEATHER

BACKGROUND OF THE INVENTION

1. Field of the Invention

The present invention relates to a synthetic resin leather which is suitable for use in general applications such as interior finishing materials and/or seats for automobiles, cover materials for furniture, etc.

2. Description of the Related Art

It is conventionally well known that synthetic resin leathers containing substrates and synthetic resin layers composed of flexible polyvinyl chloride and attached to one side of the substrates are conventionally used as materials for seat covers of automobiles or chairs. The substrates usually comprise both-sided knitted fabrics prepared by knitting single spun or mixed spun fibers made of rayon, cotton, polyester, nylon, acryl, or urethane.

However, the both-sided knitted fabric has an elongation in a longitudinal direction less than that in a transverse direction, tensile strength in the longitudinal direction higher than that in the transverse direction. Therefore, in the case where a synthetic resin leather made of such knitted fabric is applied to raw materials for car seat covers or chair covers, problems such as the generation of distortion and/or warp in curved portions, collapse in shapes, breaking, or crimp, etc. are caused in the leather due to frequent load of having users sitting in the car seats or chairs.

Also, although the substrate exhibits natural softness or flexibility (feeling) and has a function of increasing the manufacturing yield or improving needlework as a sheet assembly is formed using the needlework for the production of seats or chairs, it is difficult to exhibit the natural softness or the flexibility if the synthetic resin leather using the conventional knitted fabric having small thickness and higher tensile strength in the longitudinal direction is employed as the cover material of the car seats or other chairs, thereby resulting in concerns of having unsatisfactory feeling. Further, the known leather has problems that it is like to generate crimp during the formation of the sheet assembly and needs additional processes to flatten out crimp by exposing the leather to steam after sewing.

On the other hand, there had been proposed many studies for formation of loops in the single side knitted fabric made by grey sheeting and number of loops made of the both-sided knitted fabric and the like among the synthetic resin leather having reduced difference of elongations between in the longitudinal direction and in the transverse direction.

But, the former synthetic resin leather has a thinner thickness of the substrate because it is formed of the single side knitted fabric, inducing a defect of insufficient feeling for the leather.

Since the later synthetic resin leather made of the both-sided knitted fabric is fabricated by fibers having little elongation such as cotton, rayon, polyester, nylon, vinyl chloride fiber, etc., the leather has low elongation in the transverse direction and increased tensile strength in the transverse direction. Consequently, the above leather does not express the natural softness and/or the flexible feeling, thereby having a disadvantage of lack of leather-like feeling.

SUMMARY OF THE INVENTION

In consideration of the above problems, the present inventors expected that using the both-sided knitted fabric formed by cross-knitting stretching-difficult but resilient fibers and stretching-easy fibers is effective to provide a novel synthetic resin leather having excellent feeling. As a result of extensive studies, the inventors found that yarns having 10 to 40 in count composed of one among cellulose-based single spun or mixed spun fibers are preferably used as one of the stretching-difficult but resilient fibers while another yarns having 50 to 300 in denier composed of one selected from crimpy (woolie) long filaments, thermoplastic elastomer long filaments and polyurethane long filaments are preferably used as one of the stretching-easy fibers.

However, after completion of additionally continuous studies, the inventors further found that the above yarns composed of the long filaments such as the crimpy long filaments, the thermoplastic elastomer long filaments and the polyurethane long filaments have a lower melting point, thus, if the loops made of such yarns are continuously positioned in the longitudinal direction and in the transverse direction and on front and rear sides of the both-sided knitted fabric, the loops may be molten then easily broken or burned at the above positions. Accordingly, the synthetic resin leather using a substrate made of such knitted fabric mentioned above is insufficient to comply with traditional flame retarding standards for interior finishing materials for automobiles (FM-VSS 302, JIS D 1201 etc.) and has a difficulty in use thereof to car seats.

Accordingly, in order to overcome the above problems, it is an object of the present invention to provide a novel synthetic resin leather made of a substrate neither molten nor broken at combustion, which has small difference of elongations between in the longitudinal direction and in the transverse direction, a predetermined thickness, excellent feeling and good flame retardant property.

In order to achieve the above object, the leather of the present invention leather comprises a substrate composed of both-sided cross-knitted fabric and a synthetic resin layer attached to at least one side of the substrate, wherein the substrate is prepared by cross-knitting a first yarn (stretching-difficult, thick and resilient fibers useful for expressing leather-like feeling) of 10 to 40 in count composed of one among cellulose-based single spun or mixed spun fibers and a second yarn of 50 to 300 in denier (stretching-easy but low melting point fibers) composed of one selected from crimpy long fiber filaments, thermoplastic elastomer long fiber filaments and polyurethane long fiber filaments; and by knitting the both-sided cross-knitted fabric such that loops made of the second yarn are enclosed by another loops made of the first yarn thereby discontinuing the loops made of the second yarn in the longitudinal direction, the transverse direction, and/or on front and rear sides of the substrate.

By the above construction, since the first yarn is stretching-difficult, thick and resilient fibers, the substrate made of the both-sided knitted fabric can have desirable thickness. Additionally, cross-knitting the first yarn and the stretching-easy second yarn to form the both-sided knitted fabric provide the substrate having the small difference of elongations between in the longitudinal direction and in the transverse direction. Furthermore, since the second yarn is discontinuous in the longitudinal direction and in the transverse direction, and on the front and rear sides of the substrate, the first yarn (high-melting point yarns containing the cellulose-based fibers) adjacent to the second yarn is carbonized to prevent melting and breaking thereof even when the second yarn is molten by combustion, etc. Therefore, the synthetic resin leather comprising the substrate mentioned above has advantages of the small difference of elongations between in the longitudinal direction and in the transverse direction, natural softness and excellent flexible feeling deriving from thickness of the substrate, reduced generation of crimp in production of a sheet assembly, and good flame retardant ability.

The high-melting point yarn herein means the yarn carbonized at a temperature lower than the melting point and includes the yarns made of specified materials such as thermosetting resins substantially having no melting point.

Ratio of fiber numbers for the first yarn to the second yarn is not particularly limited and the first yarn can be continuous as far as loops formed from the second yarn are not continuous in the longitudinal direction and in the transverse direction and on the front and rear sides of the substrate.

However, in case the loops of first yarn are too much (that is, fiber number rate of the first yarn is too higher), the difference of elongations between in the longitudinal direction and in the transverse direction becomes increase and possible to lead to lack of natural feeling.

Therefore, it is preferable that the fiber number ratio for the first yarn to the second yarn is 1:1, and the loops made of the first yarn and the loops made of the second yarn are formed to alternately position in the longitudinal direction and in the transverse direction and on the front and rear sides of the substrate.

Having such construction, it can more enhance the effects described above because both of the loops made of the first yarn and the second yarn are arranged in the longitudinal direction and in the transverse direction and on the front and rear sides of the substrate.

With respect of the above synthetic resin leather, the synthetic resin layer is not particularly restricted but includes vinyl chloride resin, thermoplastic elastomer, or other synthetic resin generally employed in known synthetic resin leathers. The synthetic resin layer may be laminated on either side and/or both sides of the substrate. In addition, the synthetic resin layer can be a synthetic resin foamed leather by interposing a synthetic resin foaming layer between the substrate and the synthetic resin layer then forming an integrated laminate, and foaming the synthetic resin foaming layer.

But, since such synthetic resin layers for the synthetic resin leather mostly comprise a very soft polyvinyl chloride layer and cause recycling problem, it has been proposed that the leather is replaced by polyolefin-based leather using random polypropylene, ethylene-vinyl acetate resin and/or hydrogenated styrene butadiene rubber, etc. in place of vinyl chloride.

In this regard, the present inventors predominantly proposed a synthetic resin leather having high tear strength without damage of excellent properties of acrylic resin leather and defects in needlework such as widening and/or easy tearing of seam or the like, which comprise specified synthetic resin layer suitable for replacing the polyvinyl chloride.

Under the condition of the above predominant proposal of the present inventors, the proposed synthetic resin layer and the substrate mentioned above are combined to result in a novel and improved synthetic resin leather with synergic effect.

In one embodiment of the present invention, exemplified is the synthetic resin leather comprising a mixed resin layer composed of 50 to 95% by weight of thermoplastic polyurethane having Shore A hardness of 65 to 90 and 50 to 5% by weight of acrylic soft resin having Shore A hardness of 50 to 80, the mixed resin layer also having Shore A hardness of 60 to 80.

By such construction, the synthetic resin leather of the present invention including the mixed resin layer as the synthetic resin layer expresses flexibility and feeling substantially same to conventional soft polyvinyl chloride leather, favorable restoration, cold weather-proof and surface scratch-resistant properties, has an advantage in deposit process using high-frequency welder and no defects such as widening and/or tearing of seam in needlework using sewing machine. Furthermore, with the synergic effect by the mixed resin layer and the substrate, the present synthetic resin leather expresses very excellent feeling and good flame retardant property.

The above leather can be prepared by blending 50 to 95% by weight of thermoplastic polyurethane having Shore A hardness of 65 to 90 and 50 to 5% by weight of acrylic soft resin having Shore A hardness of 50 to 80 and optionally adding additives such as flame retardants, plasticizer, lubricant then sufficiently admixing together, forming the mixed resin layer into a sheet (mixed resin layer) by means of calendering and/or extrusion-formation, and laminating and integrating the obtained sheet with the substrate. In order to achieve a smooth calendering formation, it may further comprise (meth)acrylic polymer and/or calcium carbonate.

Although the calendering formation is preferable to form the above sheet (mixed resin layer), it also includes addition of (meth)acrylic polymer in the mixed resin layer to control melting tensile force during the calendering and to activate the calendering process. The (meth)acrylic polymer preferably comprises, for example, copolymers having molecular weights ranging from 500,000 to 5,000,000 produced by copolymerizing 50 to 90% by weight of methyl methacrylate and 50 to 5% by weight of other ethylene based unsaturated monomers capable of being copolymerized with the above methyl methacrylate. The other ethylene based unsaturated monomers include, for example, methacrylate ester of alcohol having 2 to 18 carbon atoms, acrylate ester of alcohol having 2 to 18 carbon atoms, styrene, α-methyl styrene, acrylonitrile, maleic acid, itaconic acid, etc. Amount of the (meth)acrylic polymer to be added is ranged of 0 to 30 parts by weight, preferably 2 to 10 parts by weight based on 100 parts by weight of the mixed resin.

Further, the thermoplastic polyurethane resin or the mixed resin of the thermoplastic polyurethane resin combined with any soft acrylic resin may further comprise inorganic powders such as calcium carbonate, antimony oxide, colloidal silica, magnesium silicate, magnesium hydroxide to decrease adhesive intensity during the calendering, so that the calendering process can proceed more smoothly. Particularly preferable is the calcium carbonate. Amount of the inorganic material to be added is ranged of 0 to 30 parts by weight, preferably 5 to 20 parts by weight based on 100 parts by weight of the resin.

As one of means to laminate the substrate and the sheet to be integrated, exemplified is a process comprising firstly applying adhesive on surface of the substrate, superposing the sheet on the applied surface of the substrate then pressing it under heating to adhesively combine the superposed sheet without going against, and optionally marble-printing the obtained sheet, applying polish-remover to the sheet, heating the sheet at 150 to 200° C., and pressing the sheet using a squeezing roll.

The adhesive used may include, but not limited thereto, ethylene-vinyl acetate copolymer base emulsion, polyvinyl chloride paste, bi-liquid polyurethane adhesive, epoxy adhesive, etc. Such adhesive can be applied on surface of the substrate and/or surface of the sheet.

With respect of the present synthetic resin leather, the respective elongations in the longitudinal direction and in the transverse direction are within a range of 10 to 25 N/3 cm under a modulus of 20% (according to JISK 6772) and average of the elongations in the longitudinal direction and in the transverse direction is within a range of 15 to 20 N/3 cm under the modulus of 20% (according to JISK 6772). As described above, the leather which has a small difference of elongations between in the longitudinal direction and in the transverse direction and both of the elongations being under a desirable range expresses remarkably excellent feeling, whereby the present invention provides a novel synthetic resin leather having superior quality substantially equal to or more than that of conventional soft polyvinyl chloride leather.

Moreover, the present inventors extensively discussed about improvement of abrasion-resistance for specified thermoplastic polyurethane-based elastomer layer containing the above synthetic resin layer. From the discussion, the inventors found that common cross-linked products obtained by combining the thermoplastic polyurethane-based elastomer with polyisocyanate as a cross-linking agent then heating the combined material to proceed cross-linking thereof, represented loss of thermoplastic property to a level not enough to form a sheet-like product by means of calendering process. On the other hand, the inventors found and predominantly proposed that the reactive product dynamically cross-linked under a heating and mixing condition showed no loss of thermoplastic property and could be formed into the sheet shape using the calendering, in addition to, the dynamically cross-linked thermoplastic polyurethane-based elastomer had noticeably enhanced impact-proof property. If the thermoplastic polyurethane-based elastomer layer is combined with the substrate, it may economically produce the synthetic resin leather having the excellent abrasion-resistance in addition to the above beneficial effects. Particularly, as a preferred embodiment of the synthetic resin leather according to the present invention, it may prepare a sheet-like thermoplastic polyurethane-based elastomer layer as the synthetic resin layer described above by the method comprising blending the thermoplastic polyurethane-based elastomer and the polyisocyanate, mixing the blend under heating to conduct dynamic cross-linking thereof then forming into the sheet-like product using calendering.

Composition ratio between the thermoplastic polyurethane-based elastomer and the polyisocyanate is that in case of using methylenebis(4,1-phenylene)diisocyanate as polyisocyanate, it may preferably 0.1 to 2 parts by mass based on 100 parts by mass of the thermoplastic polyurethane-based elastomer. The thermoplastic polyurethane-based elastomer layer preferably contains phosphate based plasticizer.

In this case, the synthetic resin leather can have the excellent abrasion-proof property in addition to the above flame retardant efficiency. And, the thermoplastic polyurethane-based elastomer can be formed into the sheet-like product by the calendering process, since the elastomer has also thermoplastic property in spite of being cross-linked after the dynamic cross-linking. Accordingly, the synthetic resin leather according to the present invention can be easily and economically produced. Furthermore, the present invention has an advantage of recycling the thermoplastic polyurethane-based elastomer layer after separation from the substrate.

The inventors also extensively discussed and studied the synthetic resin layer comprising thermoplastic polyurethane-based elastomer foaming layer and thermoplastic polyurethane-based elastomer non-foaming layer, and improvement of foaming property and abrasion-proof property thereof. As a result of the discussion and study, the inventors found and predominantly proposed that when a foaming agent is added to the reactant during the dynamic cross-linking, the foaming agent can enhance the foaming property, in addition to the dynamically cross-linked reactive product advantageous in the present invention. By combining the synthetic resin layer formed with the thermoplastic polyurethane-based elastomer foaming layer and the thermoplastic polyurethane-based elastomer non-foaming layer in this order and the substrate, produced is the synthetic resin leather having the excellent foaming property, other than the flame retardant property and the abrasion-proof property.

Particularly, as a preferred embodiment of the synthetic resin leather according to the present invention, it may prepare a synthetic resin layer by laminating the thermoplastic polyurethane-based elastomer foaming layer and the thermoplastic polyurethane-based elastomer non-foaming layer in order. The thermoplastic polyurethane-based elastomer foaming layer is prepared by blending polyisocyanate and a foaming agent in the thermoplastic polyurethane-based elastomer, mixing the blend under heating to obtain the thermoplastic polyurethane-based elastomer dynamically cross-linked, forming the obtained elastomer by calendering to prepare a sheet-like product, and further activating the foaming agent contained in the product to form a desired foaming layer. Alternatively, the thermoplastic polyurethane-based elastomer non-foaming layer is prepared by blending polyisocyanate in the thermoplastic polyurethane-based elastomer, mixing the blend under heating to obtain the thermoplastic polyurethane-based elastomer dynamically cross-linked, then forming the obtained elastomer by calendering to prepare a sheet-like product. The polyisocyanate is preferably methylenebis(4,1-phenylene)diisocyanate and amount thereof to be added is preferably ranged of 0.1 to 2 parts by mass and, more preferably ranged of 0.1 to 1.5 parts by mass based on 100 parts by mass of the thermoplastic polyurethane-based elastomer.

According to the present invention, the substrate is further subjected to a flame retarding process using a nitrogen/phosphorus-based flame retardant. The synthetic resin layer preferably comprises at least one selected from a phosphate-based flame retardant and a nitrogen-based flame retardant.

When the substrate is subjected to flame retarding process, if the conventional phosphorus-based flame retardant is used, it can comply with the above-mentioned flame retarding standards. In addition, the nitrogen/phosphorus-based flame retardant used in the present invention is preferably selected from a condensed ammonium phosphate, a condensed melamine phosphate, a condensed amidoammonium phosphate and phosphoric carbamate.

As the flame retardants contained in the synthetic resin layer, preferably used are phosphate and/or nitrogen-based flame retardants while halogen or antimony-based flame retardants being avoided in view of safety, cost, flame retardant efficiency, etc.

Using the above flame retardants, high flame retardant property is endowed in both of the substrate and the synthetic resin layer. Consequently, the present invention can produce the synthetic resin leather having superior flame retardant property sufficient to comply with the traditional flame retarding standards for interior finishing materials for automobiles (FMVSS 302, JIS D 1201 etc.), which is suitable for use in general applications such as interior finishing materials and/or seats for automobile, cover materials for furniture, etc.

DESCRIPTION OF THE PREFERRED EMBODIMENTS

The present invention will be described in more detail with reference to the accompanying drawings.

Figure 1:
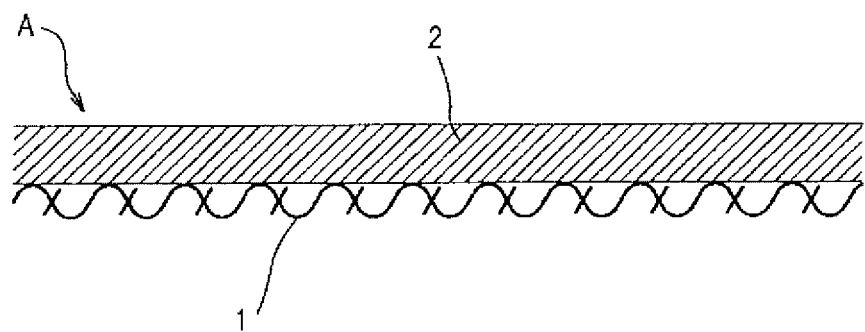
FIG. 1 is a longitudinal cross-sectional view illustrating an example of a synthetic resin leather according to the present invention.
Figure 1:
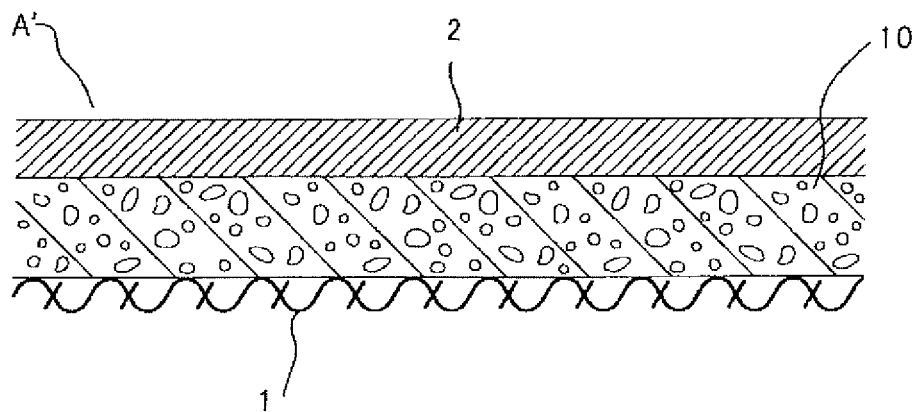

The synthetic resin leather A shown in FIG. 1(*i*) comprises a substrate 1 and a synthetic resin layer 2 attached to one side of the substrate 1 in which the substrate 1 is formed of both-sided knitted fabric by cross-knitting a first yarn 3 and a second yarn 4.

The first yarn 3 is any one with 10 to 40 in count among cellulose-based single spun fibers such as cotton, (viscose) rayon, linen, hemp, cupra, acetate, or mixed spun fibers containing the cellulosed-based single spun fibers and other materials such as polyester, nylon, acryl, urethane, which is difficult to stretch, thick and resilient to render the synthetic resin leather A having determined thickness (ranged of 0.9 mm to 1.1 mm) and excellent feeling.

If the first yarn 3 is the one having less than 10 in count among the cellulose-based single spun or mixed spun fibers, each strand of the yarns 3 is excessively thick and has the small elongation to make the substrate 1 thick and hard, thereby unfavorably losing natural softness and flexible feeling. When the yarn number of the first yarn 3 exceeds 40, the first yarn 3 is not preferable because of very small thickness and loss of resilience (that is, elastic intensity) so that the substrate 1 does not express natural softness and flexible feeling.

The cellulose fibers which are not melting but carbonized during the combustion, is useful for enhancing combustibility and flame retardant property of the synthetic resin leather.

In order for the synthetic resin leather A to express excellent feeling, the leather A preferably comprises the mixed spun fibers formed by combining the cellulose fibers and the other materials such as polyester, nylon, acryl, urethane as the first yarn. In this case, the cellulose fibers are contained in amount of 20% or more in view of improvement of combustibility and flame retardant property.

The second yarn 4 is any one with 50 to 300 in denier selected from crimpy (woolie) long fiber filaments, thermoplastic elastomer long fiber filaments and polyurethane long fiber filaments, which easily stretch and can decrease a difference of elongations for the substrate 1 between in longitudinal direction and in the transverse direction by cross-knitting the second yarn 4 with the first yarn 3.

If the second yarn is the one having less than 50 in denier selected from crimpy long fiber filaments, thermoplastic elastomer long fiber filaments and polyurethane long fiber filaments, the second yarn is not preferable because of very small thickness and reduction of tensile strength. While exceeding 300 in denier, it is not preferred that the second yarn is very thick and has the elongation decreased.

Materials for the crimpy long fiber filaments include polyester, nylon, polypropylene to endow the synthetic resin leather with resilience and excellent feeling, with polyester (among these, polyethyleneterephthalate) being preferred.

The second yarn 4 containing a cellulose-based fiber is not preferred due to lack of elongation.

The substrate 1 is obtained by cross-knitting the first yarn 3 and the second yarn 4, forming both-sided knitted fabric to enclose the loops 6 made of the second yarn 4 with the loops 5 made of the first yarn 3, thereby making the loops 6 made of the second yarn 4 discontinuous in the longitudinal direction, the transverse direction and/or on the front and rear sides of the substrate 1.

Figure 2:
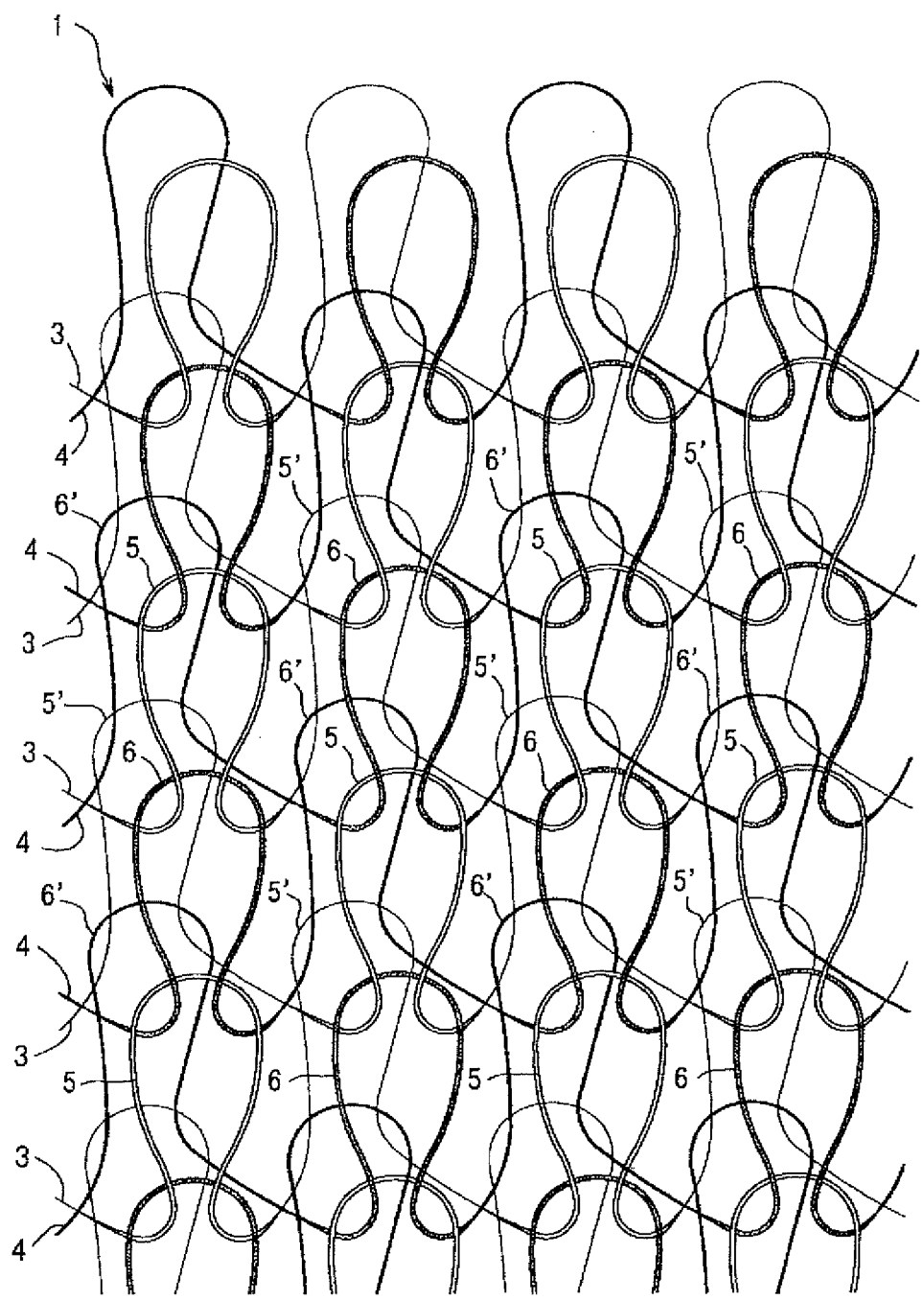
FIG. 2 is a schematic view illustrating a knitting process of a substrate in the example of the synthetic resin leather according to present invention.

FIG. 2 shows the first yarn 3 and the second yarn 4 in the fiber number ratio of 1:1, the loops 5,5' made of the first yarn 3 and the loops 6,6' made of the second yarn 4 both of the loops 5,5' and 6,6' being alternated each other in the longitudinal direction and in the transverse direction, and on the front and rear sides of the substrate 1.

Numerical symbols 5,6 mean the loops formed at surface of the substrate 1 while 5',6' being the loops formed at rear of the substrate 1, respectively. For convenience of illustrating in the drawings, both of the loops 5,5' and 6,6' represent different thicknesses of the yarns 3 and 4. In practice, however, it should be understood that the yarns 3 and 4 have the same thickness.

Figure 3:
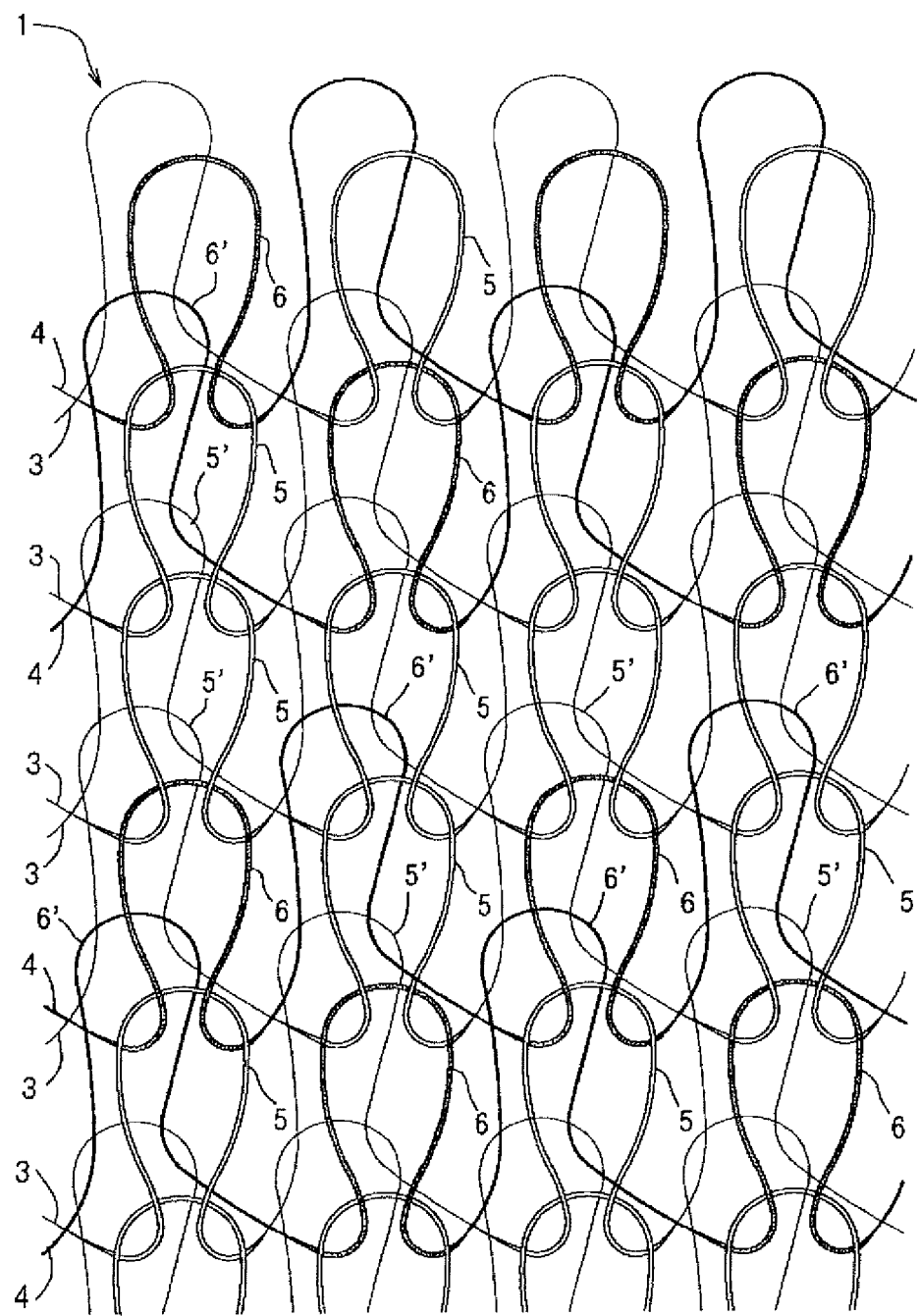
FIG. 3 is a schematic view illustrating alternative knitting process of the substrate in alternative example of the synthetic resin leather.

From FIG. 3, it is shown that the first yarn 3 and the second yarn 4 in the fiber number ratio of 2:1 and the loops 5,5' made of the first yarn 3 are continuously formed by two strands in the longitudinal direction of the substrate 1.

Figure 4:
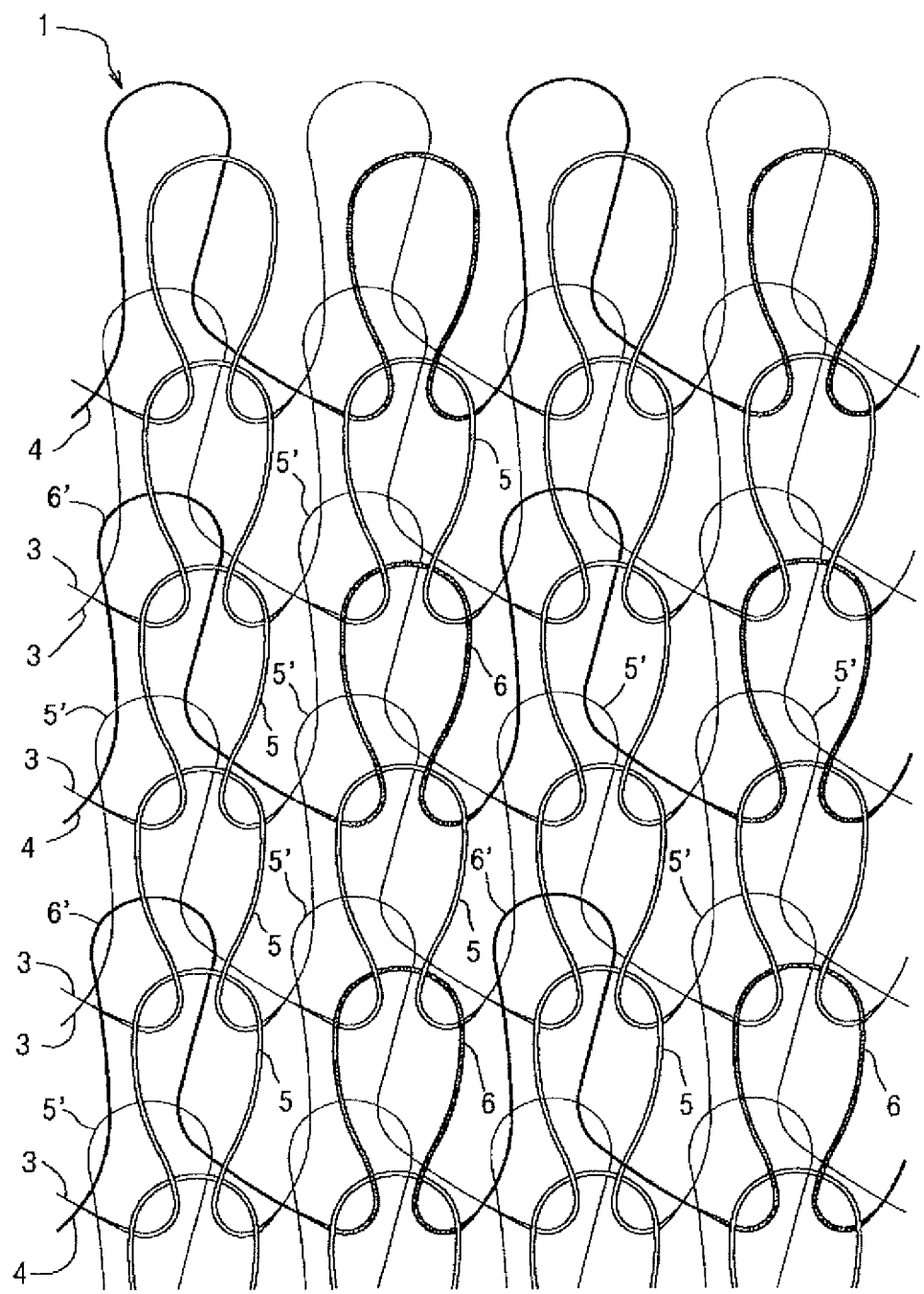
FIG. 4 is a schematic view illustrating alternative knitting process of the substrate in alternative example of the synthetic resin leather.

From FIG. 4, it is shown that the first yarn 3 and the second yarn 4 in the fiber number ratio of 3:1 and the loops 6,6' made of the second yarn 4 are arranged in series in longitudinal direction and the transverse direction of the substrate 1.

As a preferred embodiment of the synthetic resin layer 2, proposed is a mixed resin layer comprising 50 to 95% by weight of thermoplastic polyurethane and 50 to 5% by weight of acryl based soft resin.

The thermoplastic polyurethane used in the present invention can be obtained by a reaction between a diisocyanate compound and another compound having at least 2 hydroxyl groups. Among them, preferably used is polyurethane-based thermoplastic elastomer (TPU) comprising long chain polyol, diisocyanate and chain extender, for example, composed of so called soft segment and hard segment. Such elastomer preferably has a Shore A resin hardness of 65 to 90 and, more preferably 70 to 80. The Shore A hardness is a value determined according to ASTM D 2240 at 23° C.

The diisocyanate compound used in synthesis of the thermoplastic polyurethane includes, but not limited thereto, tolylene diisocyanate, diphenylmethane diisocyanate, naphthalene diisocyanate, tolidine diisocyanate, hexamethylene diisocyanate, xylylene diisocyanate, hydrogenated xylylene diisocyanate, hydrogenated dicyclohexylmethane diisocyanate, isophorone diisocyanate, etc.

The compound having at least 2 hydroxyl groups includes, but not limited thereto, polyester-based polyol as a condensation reactant of dibasic acid such as adipic acid, phthalic acid and glycol such as ethylene glycol, 1,4-butanediol; polycarbonate-based polyol as a reactant of carbonate such as ethylene carbonate and glycol; and polyether-based polyol such as polyethylene glycol, polypropylene glycol, polytetramethylene glycol, polyethylene glycol-polypropylene glycol, etc. The synthetic resin leather of the present invention preferably comprises the polyether-based polyol in view of physical properties thereof. The thermoplastic polyurethane of the present invention employs polyether-based polyol as a raw material, which has satisfactory anti-ageing property, calender-processing ability.

The chain extender includes, but not limited thereto, a lower molecular weight polyhydric alcohol such as ethylene glycol, 1,2-propylene glycol, 1,3-propylene glycol, butane-1,2-diol, butane-1,3-diol, butane-1,4-diol, butane-2,3-diol, hexanediol; or diamine or water.

The acrylic soft resin used in the present invention is a resin expressing flexibility at ordinary temperature such as soft polyvinyl chloride. The acrylic soft resin used has the shore A hardness of 50 to 80 and, preferably 55 to 65. The acrylic soft resin is a multi-layered polymer, that is, preferably a particle type polymer consisting of a core-shell form of multi-layer structure by at least two kinds of acrylic polymer. Such acrylic soft resin shows fine flexibility at ordinary temperature, has excellent bending-resistant property and weather-proof property.

A preferred embodiment of the acrylic soft resin used in the present invention will be described in detail as follows. The acrylic soft resin is an acrylic soft resin having multi-layered structure comprising [A] at least one polymeric layer in an amount of 10 to 90 parts by weight obtained by polymerizing a mixed monomer which includes 30 to 99.9% by weight of at least one alkyl acrylate containing an alkyl group having 1 to 12 carbon atoms, 0 to 70% by weight of at least one alkyl methacrylate containing an alkyl group having 1 to 8 carbon atoms, 0 to 30% by weight of unsaturated monomer possible to form copolymer and 0.1 to 10% by weight of polyfunctional graft monomer and/or polyfunctional graft monomer, and having Tg of 30° C. or less; and [B] at least one polymeric layer in an amount of 90 to 10 parts by weight obtained by polymerizing another mixed monomer which includes 30 to 99% by weight of at least one alkyl acrylate containing an alkyl group having 1 to 12 carbon atoms, 1 to 70% by weight of at least one alkyl methacrylate containing an alkyl group having 1 to 8 carbon atoms, and 0 to 30% by weight of unsaturated monomer possible to form copolymer, and having Tg of −20 to 50° C.; and further comprising an outermost layer made of the [B] polymeric layer.

Alternative preferred embodiment of the acrylic soft resin used in the present invention is described in detail as follows. The acrylic soft resin is an acrylic soft resin having multi-layered structure comprising a rubber layer in an amount of 30 to 80 parts by weight obtained by polymerizing 60 to 99.5% by weight of alkyl acrylate containing an alkyl group having 1 to 8 carbon atoms, 0 to 39.5% by weight of monofunctional monomer having a copolymerable vinyl group, and 0.5 to 5% by weight of polyfunctional monomer having at least two vinyl or vinylidene groups; and a hard resin layer in an amount of 20 to 70 parts by weight obtained by polymerizing 40 to 100% by weight of methyl methacrylate, 0 to 60% by weight of alkyl acrylate containing an alkyl group having 1 to 8 carbon atoms, 0 to 20% by weight of monomer having vinyl or vinylidene groups possible to form copolymer, and 0.5 to 5% by weight of polyfunctional monomer having at least two vinyl or vinylidene groups; and further comprising an outermost layer made of the hard resin layer.

Alternative preferred embodiment of the acrylic soft resin used in the present invention is described in detail as follows. The acrylic soft resin is an acrylic soft resin having multi-layered structure with mean particle size of 0.01 to 0.3 μm comprising [A] a hard polymeric layer as an innermost layer in an amount of 5 to 30 parts by weight obtained by polymerizing a mixed monomer which includes 80 to 98.99% by weight of methyl methacrylate, 1 to 20% by weight of alkyl acrylate containing an alkyl group having 1 to 8 carbon atoms, 0.01 to 1% by weight of polyfunctional grafting agent and 0 to 0.5% by weight of polyfunctional cross-linking agent; [B] another hard polymeric layer as an intermediate layer in an amount of 20 to 45 parts by weight obtained by polymerizing another mixed monomer which includes 70 to 99.5% by weight of alkyl acrylate containing an alkyl group having 1 to 8 carbon atoms, 0 to 30% by weight of alkyl ester methacrylate, 0.5 to 5% by weight of polyfunctional grafting agent and 0 to 5% by weight of polyfunctional cross-linking agent; and [C] still further hard polymeric layer as an outermost layer in an amount of 50 to 75 parts by weight obtained by polymerizing further mixed monomer which includes 90 to 99% by weight of alkyl methacrylate and 10 to 1% by weight of alkyl acrylate containing an alkyl group having 1 to 8 carbon atoms.

With respect of the synthetic resin leather according to the present invention, the thermoplastic polyurethane and acrylic soft resin has a combination ratio of 50 to 95% by weight of thermoplastic polyurethane and 60 to 5% by weight of acrylic soft resin, preferably 60 to 90% by weight of thermoplastic polyurethane and 40 to 10% by weight of acrylic soft resin and, more preferably 70 to 90% by weight of thermoplastic polyurethane and 30 to 10% by weight of acrylic soft resin. If the thermoplastic polyurethane is less than 50% by weight, the resin leather lacks tear strength to cause seams to be widen and/or easily torn or broken. When the thermoplastic polyurethane exceeds 95% by weight, the leather expresses hard feeling undesirable for use thereof and has a trouble of being decomposed due to higher temperature for the calendering process.

Adding any plasticizer to the mixed resin layer, it can improve flexibility and feeling of the leather product and reduce the calendering temperature of the mixed resin, resulting in inhibiting decomposition of the thermoplastic polyurethane during processing.

For phosphate-based plasticizer, it may also sometimes serve as the flame retardant. In this case, the plasticizer can be used as the flame retardant concurrently.

The plasticizer includes, but not limited thereto, phthalate such as di-2-ethylhexyl phthalate, isobutyl phthalate, diisodecyl phthalate; trimellitate such as 2-ethylhexyl trimelitate; aliphatic dibasic acid ester such as di-2-ethylhexyl adipate, di-isononyl adipate, di-2-ethylhexyl sebacate; epoxidized soybean oil; an epoxy-based plasticizer such as butyl epoxystearate; phosphate such tricresyl phosphate; citrate such tributyl acetylcitrate. Among them, aromatic carboxylate ester such as phthalate, trimellitate is preferably used in view of high plasticization rate and less problems such as bleeding. Amount of such plasticizer is ranged of 0 to 50 parts by weight and, preferably 3 to 20 parts by weight based on 100 parts by weight of the mixed resin. A large amount of the plasticizer may cause troubles such as bleed and be not preferable.

The mixed resin layer may further comprise, optionally, typical additives such as lubricant, UV absorber, light stabilizer, pigment, antibacterial agent, etc. used in general synthetic resin. The lubricant includes, for example, metal salts of an aliphatic acid such as calcium, magnesium, zinc or barium of stearic acid; polyethylene wax; stearic acid; amide alkylene-bis aliphatic acid, etc. The UV absorber includes, for example, benzotriazole based UV absorber such as 2-(2'-hydroxy-5'-methylphenyl)benzotriazole. The light stabilizer includes, for example, hindered amine based light stabilizer such as bis-(2,2,6,6-tetramethyl-4-piperidinyl)sebacate. The antibacterial agent includes, for example, silver based inorganic antibacterial agent.

The mixed resin layer preferably has the shore A hardness of 60 to 80. Such hardness is obtainable using both of thermoplastic polyurethane having the shore A hardness of 65 to 90 and acrylic soft resin having the shore A hardness of 50 to 80. With the above hardness, obtainable is the leather expressing improved flexibility, feeling and touch substantially equivalent to a leather comprising a soft polyvinyl chloride layer containing a plasticizer (diethylhexyl phthalate) of 70 to 100 parts by weight based on 100 parts by weight of polyvinyl chloride.

In order to adhere a mixed resin sheet (synthetic resin layer 2) containing the above mixed resin layer and the substrate 1, adhesive such as ethylene-vinyl acetate copolymer based emulsion, polyvinyl chloride paste, bi-liquid polyurethane adhesive is used. Such adhesive can be applied to surface of the substrate 1 and/or surface of the mixed resin. In order to attach the substrate 1 and polypropylene foam sheet or polypropylene foam sheet and the mixed resin sheet, additional primer layer may be applied on surface of the polypropylene foam sheet to improve adhesive ability of the primer layer such as polyurethane primer layer or epoxy resin primer layer.

The synthetic resin leather A of the present invention can be used in general applications including interior finishing materials for automobile (such as seat, head rest, toner cover, sun visor, ceiling, etc.), interior finishing materials for building, cover materials for saddle of two-wheeled vehicle, cover materials for furniture (chair, sofa, etc.), materials for bag, sleeveless raincoat, apron, etc. For example, for flexible containers, the mixed resin layer (synthetic resin layer 2) which is applied on both sides of the substrate 1 can be employed.

The synthetic resin leather A is prepared by, as shown in FIGS. 2 to 4, knitting both-sided fabric to enclose the loops 6 made of the second yarn 4 with the loops 5 made of the first yarn 3 to render the loops 4 discontinuous in the longitudinal direction and in the transverse direction and on the front and rear sides of the substrate 1, thereby expressing the excellent flame retardant property.

Among them, when the fiber number ration of 1:1 for the first yarn 3 and the second yarn 4 and when the loops 5 of the first yarn and the loops 6 of the second yarn are alternated each other in the longitudinal direction and in the transverse direction, and on the front and rear sides of the substrate 1 according to the knitting method illustrated in FIG. 2, it can obtain desirable results, that is, including the small difference of elongations between in the longitudinal direction and in the transverse direction, the excellent feeling and flame retardant property.

The substrate 1 is more preferably under flame retarding processing. The flame retarding processing comprises applying dispersion and/or solution mixture of a nitrogen/phosphorus-based flame retardant to the substrate then fixing the flame retardant over the substrate under heating and drying. The application of the dispersion and/or solution mixture is carried out by immersion, coating, spraying, etc.

The nitrogen/phosphorus-based flame retardant preferably includes, for example, at least one or two of flame retardants selected from a condensed ammonium phosphate, a condensed melamine phosphate, a condensed amidoammonium phosphate and phosphoric carbamate. Particularly, since phosphoric carbamate has favorable adhesiveness to the substrate, it provides good durability and allows preferable flame retarding processing even without emulsion or aqueous solution of synthetic resin described below. Preparation of such dispersion and/or solution is conducted in the presence of acetone, isopropyl alcohol, water, etc.

With respect of the flame retarding processing, it may also use a mixture of the emulsion or aqueous solution of synthetic resin with the nitrogen/phosphorus-based flame retardant. By using the emulsion or aqueous solution of synthetic resin together with the flame retardant, the flame retardant property itself tends to decrease although durability and effect of the flame retarding processing are ensured. The emulsion or aqueous solution of synthetic resin includes emulsions or aqueous solutions of, for example, acrylate or methacrylate polymer; copolymer of acrylate or methacrylate monomer and other vinyl-based monomer such as acrylic acid, vinyl acetate; copolymer of acrylate or methacrylate monomer and olefin-based monomer such as ethylene; polyurethane, polyvinyl acetate, ethylene-vinyl acetate copolymer; polyester; styrene-butadiene rubber, etc. Composition of the flame retardant to the synthetic resin (in solid content) among the solution mixture is ranged of 5 to 100 parts by mass based on 100 parts by mass of the synthetic resin to prepare the desirable leather.

For the synthetic resin layer 2, it is preferable to contain the phosphate flame retardants in order to increase the flame retardant ability of the synthetic resin leather A. The phosphate flame retardant includes, for example, tricresyl phosphate, credylphenyl phosphate, trixylenyl phosphate, cresyl-2,6-xylenyl phosphate, resorcinol diphosphate, condensed aromatic phosphate, etc. However, the above flame retardant should have the molecular weight of 350 or more since it with less than 350 of molecular weight is high-volatile and not preferably used as interior finishing materials for automobile. Because the condensed phosphate with high molecular weight has the flame retardant property slightly reduced, the aromatic phosphate having the molecular weight of about 350 to 500 is preferably employed. In addition, the flame retardant used in the present invention can preferably further comprise the nitrogen-based flame retardant. Among the nitrogen-based flame retardant, exemplified are melamine cyanurate, diamine diamide, hydrazodicarbonamide, melamine, benzoguanamine, etc.

FIG. 1(ii) illustrates the foamed synthetic resin leather A' obtained by interposing a synthetic resin foaming sheet 10 between the substrate 1 and the synthetic resin layer 2 and adhering together, then activating the synthetic resin foaming layer 10 to produce the foamed product. Such synthetic resin foaming layer 10 also preferably contains the phosphate-based flame retardant described above, or together with use of the nitrogen-based flame retardant to improve the flame retardant property.

Next, another embodiment of the synthetic resin layer 2 will be described in detail and the description of the same parts described above will be omitted.

For the examples for this embodiment, the thermoplastic polyurethane-based elastomer layer as the synthetic resin layer 2 can be obtained by combining the thermoplastic polyurethane-based elastomer with polyisocyanate, and heating and kneading the combination to obtain a dynamically cross-linked thermoplastic polyurethane-based elastomer, then forming the elastomer into a sheet-like product by means of calendering process. A composition ratio between the thermoplastic polyurethane-based elastomer and the polyisocyanate is preferably 0.1 to 2 parts by mass of the polyisocyanate based on 100 parts by mass of the thermoplastic polyurethane elastomer, in the case where methylene bis(4, 1-phenylene)diisocyanate is used as the polyisocyanate. Additionally, the thermoplastic polyurethane-based elastomer layer may preferably further comprise a phosphorous-based plasticizer.

With respect to the dynamically cross-linked thermoplastic polyurethane-based elastomer layer, the thermoplastic polyurethane-based elastomer as a raw material preferably includes polyurethanes obtained by reacting a diisocyanate compound and another compound having at least two hydroxyl groups, and among them, preferred are the thermoplastic polyurethane-based elastomers (TPU) composed of so-called a soft segment and a hard segment, which can be obtained by addition polymerization of diisocyanate with both a long-chain glycol and a short-chain glycol (that is, a short-chain extender), both having activated hydrogen at the termini. These elastomers preferably have Shore A resin hardness of 65 to 90 and, more preferably 70 to 80. In the present invention, the shore A hardness is a value measured according to ASTM D 2240 (at a temperature of 23° C.). The diisocyanate compound, the long-chain glycol and the chain extender used are the same as those as described above.

The polyisocyanate based thermoplastic elastomer is The dynamically cross-linked by combining the polyurethane-based thermoplastic elastomer with the polyisocyanate and then thoroughly mixing them using a blender. The polyisocyanate is preferably an aromatic polyisocyanate, which allows a dynamic cross-linking reaction to proceed at a desirable temperature for achieving a good shear force and an excellent kneading efficiency upon carrying out a dynamical cross-linking reaction under heating and kneading. Particularly, methylene bis(4,1-phenylene)diisocyanate (MDI) is preferred. In addition to this, tolylene diisocyanate (TDI) can be employed, but it has a boiling point of 250° C. near to the processing temperature, thus may cause a problem of generating toxicity during distillation and dispersion. The aliphatic polyisocyanate requires high cross-linking temperatures, causing a low kneading efficiency, and thus its use is not suitable. The polyisocyanate is preferably used in a master batch mode, that is, the liquid polyisocyanate is combined with a synthetic resin such as polyester, etc., and then solidified and pelletized. By this way, the polyisocyanate is uniformly mixed with the polyurethane-based thermoplastic elastomer as the raw material before starting the cross-linking. Although the polyisocyanate may be blocked to inhibit the reaction, a blocking process is not needed in the present invention because there is no particular process that causes a problem regarding the earlier cross-linking.

An amount of the polyisocyanate added to the polyurethane-based thermoplastic elastomer is, in the case of using methylene bis(4,1-phenylene)diisocyanate (MDI), preferably 0.1 to 2.0 parts by mass based on 100 parts by mass of the thermoplastic elastomer, more preferably 0.2 to 0.6 parts by mass in view of abrasion-resistance and recycling. With less than 0.1 parts by mass, the efficiency for the cross-linking reaction decreases to an unsatisfactory level, whereas with more than 2.0 parts by mass, the calendering workability deteriorates. In the case of using polyisocyanates other than the above methylene bis(4,1-phenylene)diisocyanate (MDI), the amount thereof can be suitably determined based on the molecular weight and the number of an isocyanate group.

The mixture containing the polyurethane-based thermoplastic elastomer and the polyisocyanate mentioned above are heated and kneaded. The cross-linking reaction proceeds by heating and kneading. As a result, the polyurethane-based thermoplastic elastomer is dynamically cross-linked.

In order to carry out the heating and kneading process, a device which can load a high shear force such as a Banbury type or twin-screw extruder is employed. In the case of heating under such high shear force, for example, heating and kneading using a Banbury mixer, the process typically takes about 3 to 10 minutes at 130 to 200° C.

The thermoplastic polyurethane-based elastomer obtained by dynamically cross-linking under heating and kneading is placed on the calender to molding it to a sheet-like product. In the case of dynamically cross-linking, once cooling and then heating to obtain a sheet-like product, the workability of the product becomes low. Accordingly, it is preferable that the dynamic cross-linked material is molded to the sheet-like product without cooling. The calendering device is not specifically//limited, but it may be of, for example, reverse L-type, Z-type, L-type, etc. In the case where a 4-roll reverse L-type calender is employed, the surface temperature of the roll is preferably 140 to 160° C. After the rolling to a sheet with a thickness of 0.07 to 0.5 mm using the calender, the obtained sheet is cooled, and then wound over. A mixing roll or a warming roll is optionally employed.

Further, the acrylic soft resin may be combined with the dynamically cross-linked thermoplastic polyurethane-based elastomer layer, if necessary. The acrylic soft resin is a multi-layered polymer, that is, preferably a particulate polymer wherein at least two kinds of acrylic polymers form a core/shell form of a multi-layer structure, and the acrylic soft resin has preferably a shore A hardness of 50 to 80, more preferably 65 to 75. Such an acrylic soft resin exhibits good flexibility at room temperature, and has excellent bending and durability and good weather-resistance. A composition ratio of the acrylic soft resin to the dynamically cross-linked thermoplastic polyurethane-based elastomer [Dynamically cross-linked thermoplastic polyurethane-based elastomer:acrylic soft resin] (by mass) is 80:20 to 70:30.

Further, a plasticizer, a lubricant, a UV absorber, a photo-stabilizer, a pigment, an antibacterial agent, etc. which are usually combined with the synthetic resin, may be further combined. Addition of the plasticizer can improve the flexibility and/or the feeling of products. Addition of the plasticizer also lowers the temperature for the calendering process, thereby inhibiting decomposition of the dynamically cross-linked polyurethane-based elastomer. Such a plasticizer is preferably a phosphate ester-based plasticizer such as tricresyl phosphate, etc. The phosphate ester-based plasticizer may have a function as a flame-retardant, and in such a case, it has an advantage in that it serves as a plasticizer and a flame-retardant concurrently. The above-described combination can be preferably incorporated when mixing the polyurethane-based thermoplastic elastomer and the polyisocyanate in a master batch.

The synthetic resin leather is produced by laminating the above-described sheet-like product over the substrate using an adhesive. After lamination, if necessary, marble printing, coating treatment with a polish regulator or embossing treatment may be performed on the surface.

Another embodiment of the synthetic resin layer 2 will be described in detail and the description of the same parts described above will be omitted.

For the examples of this embodiment, the synthetic resin layer 2 is formed by successively laminating a thermoplastic polyurethane-based elastomer foaming layer and a thermoplastic polyurethane-based elastomer non-foaming layer. The thermoplastic polyurethane-based elastomer foaming layer is prepared by combining the thermoplastic polyurethane-based elastomer with the polyisocyanate and a foaming agent, heating and kneading the combination to obtain a dynamically cross-linked thermoplastic polyurethane-based elastomer, molding the obtained elastomer by calendering to a sheet-like product, and then foaming the product. The thermoplastic polyurethane-based elastomer non-foaming layer is prepared by combining the polyisocyanate with the thermoplastic polyurethane-based elastomer, heating and kneading the combination to obtain a dynamically cross-linked thermoplastic polyurethane-based elastomer, then molding the obtained elastomer by calendering to a sheet-like product. The polyisocyanate is preferably methylene bis(4,1-phenylene)diisocyanate and the amount thereof is preferably 0.1 to 2 parts by mass, and more preferably 0.1 to 1.5 parts by mass based on 100 parts by mass of the thermoplastic polyurethane-based elastomer.

Herein, the dynamically cross-linked thermoplastic polyurethane-based elastomer foaming layer is produced by placing the dynamically cross-linked polyurethane-based elastomer with the foaming agent incorporated on the calender, molding it to a sheet-like material, laminating the sheet-like material over a substrate, and then activating the foaming agent by foaming treatment. Even in the case where it takes about 2 or 3 days from the formation of the sheet-like product using the calender to the foaming, in particular the condition of foamed cell does not become worse. Since it requires sufficiently and thoroughly mixing of the dynamically cross-linked polyurethane-based elastomer with the foaming agent, the foaming agent may be preferably combined before the dynamic cross-linking process. That is, it is preferable to combine thermoplastic polyurethane-based elastomer as a raw material with polyisocyanate as a plasticizer and a foaming agent, and then heating and kneading the combination to allow dynamic cross-linking thereof, thereby obtaining a dynamically cross-linked thermoplastic polyurethane-based elastomer with the foaming agent incorporated.

In molding to a sheet-like product on the calender, the thermoplastic polyurethane-based elastomer with the foaming agent incorporated, dynamically cross-linked by heating and kneading, exhibits lowered workability, in the case of once cooling and then heating, and mold to a sheet-like product, workability is lowered. Accordingly, it is preferable that the dynamic cross-linked material is molded to the sheet-like product as it is without cooling. The calendering device is not specifically limited, but it may be of, for example, reverse L-type, Z-type, L-type, etc. In the case where a 4-roll reverse L-type calender is employed, the surface temperature of the roll is preferably 140 to 160° C. After the rolling to a sheet with a thickness of 0.07 to 0.5 mm using the calender, the obtained sheet is cooled, and then wound over. A mixing roll or a warming roll is optionally employed.

The foaming agent includes, for example, azodicarbonamide (ADCA), p,p'-oxybis (benzenesulfonyl) hydrazide (OBSH), p-toluene sulfonyl hydrazide (TSH), dinitropentamethylene tetramine (DPT), etc. which may be used alone or in combination of two or more. The foaming ratio of the foaming agent is not specifically limited, but preferably about 2 to 6 times for excellent feeling of the product. A conventionally known thermoplastic polyurethane-based elastomer represents substantially no change of viscosity corresponding to the temperature change at near the foaming temperature. Therefore, the foaming intensively proceeds at the part which earlier reached the foaming temperature. As a result, uniform foamed cells are not produced, but large foamed cells are produced, and thus the intensity and the bulky feeling are deteriorated. After calendering, some unreacted cross-linking agent still remains in the thermoplastic polyurethane-based elastomer with the foaming agent incorporated of the present invention. Also, at near the foaming temperature to be set higher than the calendering temperature, the cross linking reaction is caused, and thus the viscosity of the parts which earlier reach the foaming temperature is slightly increased. As a result, uniform and fine foamed cells are generated. Consequently, the foamed layer having bulky feeling with high intensity. The foaming temperature is preferably about 20 to 50° C. higher than the dynamic cross-linking temperature. With 20° C. or lower, the amount of the decomposed foaming agent during dynamic cross-linking is increased, while with 50° C. or higher, the produced sheet becomes soft so much. In addition, the decomposition of the thermoplastic polyurethane-based elastomer proceeds during the process, and further in the case of using a nitrogen-based flame-retardant such as hydrazodicarbonamide, the decomposition thereof starts. For example, if the dynamic cross-linking temperature is 160° C., the foaming temperature should be controlled to about 190° C. using a foaming aid.

The thermoplastic polyurethane-based elastomer of the thermoplastic polyurethane-based elastomer non-foaming layer laminated on the dynamically cross-linked thermoplastic polyurethane-based elastomer foaming layer, preferably includes polyurethane obtained by reacting the above-described diisocyanate compound and the compound having at least two hydroxyl groups, and more particularly a polyurethane-based elastomer (TPU) consisting of so-called a soft segment and a hard segment, which can be obtained by addition polymerization of the diisocyanate with both of long-chain glycol and short-chain glycol (that is, a short-chain extender) having activated hydrogen at the termini. This elastomer preferably has a shore A resin hardness of 65 to 90 and particularly 70 to 80. In particular, preferred is the dynamically cross-linked thermoplastic polyurethane-based elastomer synthesized as described above using the above elastomers as the raw material. Such a thermoplastic polyurethane-based elastomer is placed on the calender, molded to a sheet-like material and then used for lamination.

The above dynamically cross-linked thermoplastic polyurethane-based elastomer foaming layer and/or the above thermoplastic polyurethane-based elastomer non-foaming layer may optionally comprise an acrylic soft resin. The acrylic soft resin is a multi-layered polymer, that is, preferably a particulate polymer wherein at least two kinds of acrylic polymers form a core/shell form of a multi-layer structure, and the acrylic soft resin has preferably a shore A hardness of 50 to 80, more preferably 65 to 75. Such an acrylic soft resin exhibits good flexibility at room temperature, and has excellent bending and durability and good weather-resistance. The composition ratio of the acrylic soft resin to the dynamically cross-linked thermoplastic polyurethane-based elastomer [Dynamically cross-linked thermoplastic polyurethane-based elastomer:acrylic soft resin] (by mass) is 80:20 to 70:30.

Further, a plasticizer, a lubricant, a UV absorber, a photostabilizer, a pigment, an antibacterial agent, etc. which are usually combined with the synthetic resin, may be further combined. Addition of the plasticizer can improve the flexibility and/or the feeling of products. Addition of the plasticizer also lowers the temperature for the calendering process, thereby inhibiting decomposition of the dynamically cross-linked polyurethane-based elastomer. Such a plasticizer is preferably a phosphate ester-based plasticizer such as tricresyl phosphate, etc. The phosphate ester-based plasticizer may have a function as a flame-retardant, and in such a case, it has an advantage in that it serves as a plasticizer and a flame-retardant concurrently. The above-described combination can be preferably incorporated when mixing the polyurethane-based thermoplastic elastomer and the polyisocyanate in a master batch.

Thus molded, dynamically cross-linked polyurethane-based elastomer with a foaming agent is laminated on the substrate using a urethane-based adhesive, then a dynamically cross-linked polyurethane-based elastomer is laminated thereon, and after lamination, and then activating the foaming agent by foaming treatment to produce a synthetic resin leather. Further, before or after the foaming or the embossing treatment, if necessary, marble printing or coating treatment with a polish regulator may be performed.

EXAMPLE

The invention will be described in more detail with reference to the Examples and Comparative Examples relating to the invention.

Examples 1 to 3

A sheet with a thickness of 0.25 mm as a synthetic resin layer was formed by combining 80 parts by weight of thermoplastic polyurethane (UHE-75A: manufactured by Mitsubishi Gas Chemical Co., Ltd., polyurethane obtained using specified ether-based polyol, Shore A hardness 77), 20 parts by weight of an acrylic soft resin (SA-1000P: manufactured by Kuraray Co., Ltd., Shore A hardness 70), 5 parts by weight of a methyl methacrylate-alkyl acrylate copolymer (Metablen P-530A: manufactured by Mitsubishi Rayon Co., Ltd.), 10 parts by weight of calcium carbonate (NS-A: manufactured by Nitto Funka Kogyo K. K.), 0.3 parts by weight of an antibacterial agent (PEP-36: Asahi Denka Industries Co.), 0.5 parts by weight of a lubricant (polyethylene wax), 0.7 parts by weight of a UV absorber (benzotriazole-based), 0.3 parts by weight of a photostabilizer (HALS) and a trace amount of a pigment, following by calendering molding.

On the synthetic resin sheet (the synthetic resin layer 2), mixed spun were a first yarns 3 with 20 In count composed of 65% polyester (polyethylene terephthalate) and 35% rayon and a second yarns 4 with 150 in denier composed of polyester (polyethyl terephthalate) crimpy long fiber filaments. Example 1 was for a synthetic resin leather produced by attaching the substrate 1 made of the fabric knitted on both sides as shown in FIG. 2. Further, Example 2 related to another synthetic resin leather produced by attaching the substrate 1 made of the fabric knitted on both sides as shown in FIG. 3, and Example 3 related to a synthetic resin leather produced by attaching the substrate 1 made of the fabric knitted on both sides as shown in FIG. 4.

Comparative Example 1

Figure 5:
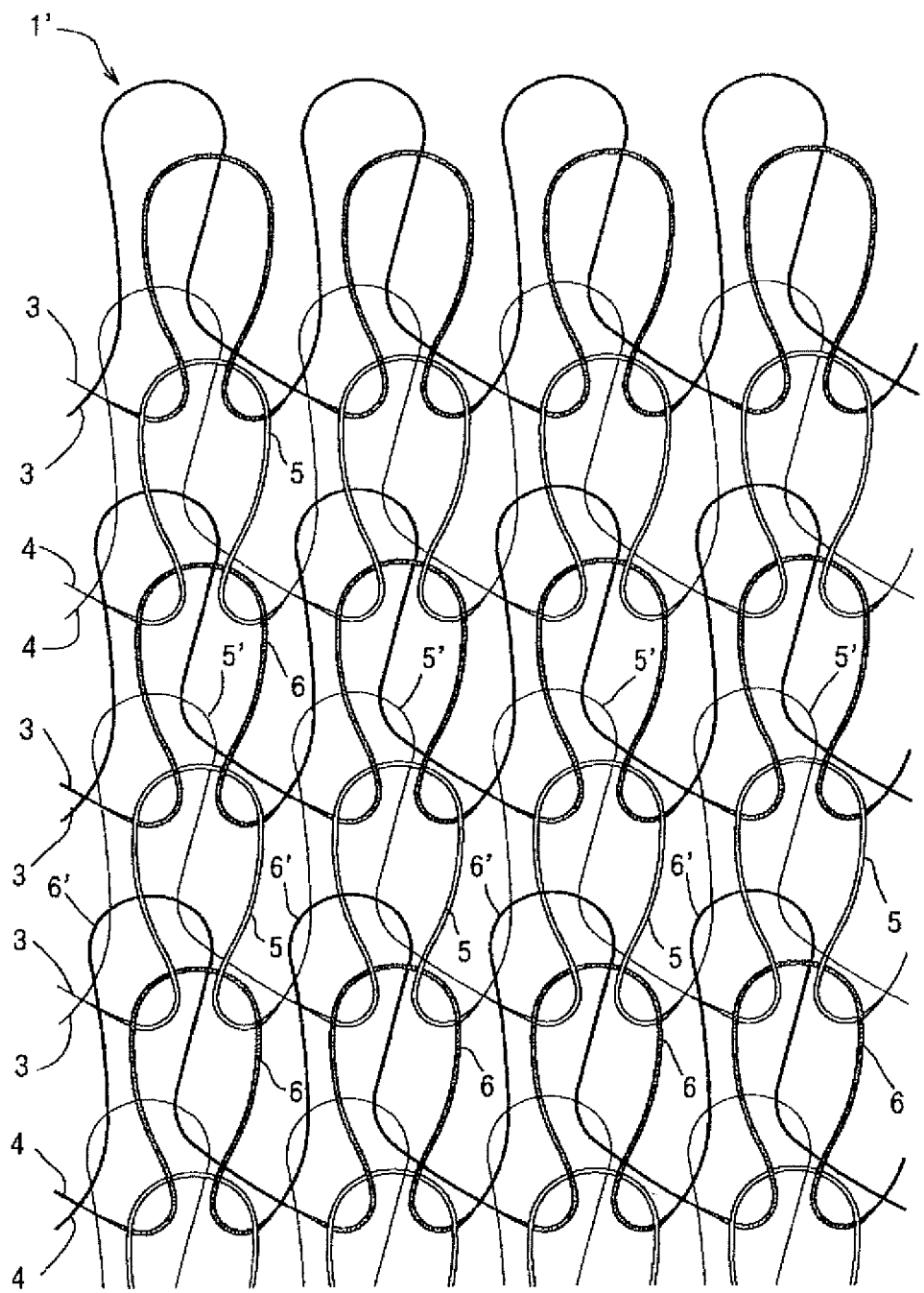
FIG. 5 is a schematic view illustrating a knitting process of the substrate in a comparative example of the synthetic resin leather.

The synthetic resin leather was produced in the same manner as in Examples 1 to 3 except for using the substrate 1' illustrated in FIG. 5.

The above substrate 1' was obtained by mix-spinning the above first yarns 3 and the above second yarns 4 and continuously arranging the loops 6,6' in the transverse direction and on the front and rear sides of the substrate 1'.

Comparative Example 2

The synthetic resin leather was produced in the same manner as in Examples 1 to 3 except for using a specified substrate made of the fabric knitted on both sides obtained using only the first yarns 3.

Comparative Example 3

The synthetic resin leather was produced in the same manner as in Examples 1 to 3 except for using another specified substrate made by grey sheeting using only the second yarns 4.

With respect to all of the synthetic resin leathers obtained in the Examples and the Comparative Examples, combustibility, elongations in the longitudinal direction and in the transverse direction, flexibility, seam extension condition, feeling (sensory evaluation) and workability at a time of sheet assembly process, were tested and the results thereof are shown in Table 1.

TABLE 1

|  | Example 1 | Example 2 | Example 3 | Comparative example 1 | Comparative example 2 | Comparative example 3 |
| --- | --- | --- | --- | --- | --- | --- |
| Knitting method of substrate | Cross-knitting/knitting on both sides (FIG. 2) | Cross-knitting/knitting on both sides (FIG. 3) | Cross-knitting/knitting on both sides (FIG. 4) | Cross-knitting/knitting on both sides (FIG. 5) | Knitting on both sides of first yarns | Grey sheeting of second yarns |
| Combustibility | ○ | ○ | ○ | X | ○ | X |
| Elongation in the longitudinal direction | 20.6 N/3 cm | 21.6 N/3 cm | 23.5 N/3 cm | 19.6 N/3 cm | 70.6 N/3 cm | 19.6 N/3 cm |
| Elongation in the transverse direction | 12.7 N/3 cm | 12.7 N/3 cm | 12.7 N/3 cm | 12.7 N/3 cm | 27.0 N/3 cm | 8.5 N/3 cm |
| Average of elongations in both of the longitudinal and the transverse directions | 16.65 N/3 cm | 17.15 N/3 cm | 18.1 N/3 cm | 16.15 N/3 cm | 48.8 N/3 cm | 14.05 N/3 cm |
| Flexibility | ○ | ○ | ○ | ○ | X | ○ |
| Seam extension condition | ○ | ○ | ○ | ○ | ○ | X |
| Thickness (mm) | 1.06 | 1.04 | 0.98 | 1.05 | 0.82 | 0.73 |
| Feeling | ○ | ○ | ○ | ○ | ○ | X |

TABLE 1-continued

|  | Example 1 | Example 2 | Example 3 | Comparative example 1 | Comparative example 2 | Comparative example 3 |
|---|---|---|---|---|---|---|
| Workability at a time of the sheet assembly process | ◯ | ◯ | ◯ | ◯ | X | ◯ |

As shown in Table 1, the synthetic resin leather was evaluated for combustibility by igniting the leather after making the leather parallel with the synthetic resin layer faced downward, where x represented that the leather burned out and drooped and O represented that the leather calmly burned out without drooping.

Tensile strength in the longitudinal direction and in the transverse direction was evaluated according to 20% Modulus Test according to JIS K 6772 (Tensile strength at 20% elongation).

Flexibility was evaluated by directly touching each of the obtained leathers and comparing sensory feeling of each of the leathers with that of a soft polyvinyl chloride leather (the leather made of a polyvinyl chloride composition comprising 100 parts by weight of polyvinyl chloride and 100 parts by weight of diethylhexyl phthalate as a plasticizer). "O" indicates that the feeling substantially equals to that of the polyvinyl chloride leather, while X indicates that the leather had hard feeling, thus it being impossible to replace the soft polyvinyl chloride therewith.

Seam extension condition was tested using each leather under a condition complying with a Fatigue Test of Seam according to JASO M403-83 and then the condition of the seam was visibly observed. "O" represented that the favorable seam was not extended, while x represented that the favorable seam was extended, thus having no commercial value.

Feeling was evaluated by sensing feeling at taking a seat where the synthetic resin leathers obtained in the Examples and Comparative examples were used as the cover materials for car seats, and comparing them with those of a soft polyvinyl chloride leather (the leather made of a polyvinyl chloride composition comprising 100 parts by weight of polyvinyl chloride and 100 parts by weight of diethylhexyl phthalate as a plasticizer). "O" represented that the feeling substantially equals to that of the polyvinyl chloride leather, while x represented that the leather has the poor feeling compared with that of the soft polyvinyl chloride.

Workability at a time of the sheet assembly process was evaluated by sewing the sheet in a form of seat, carrying out the sheet assembly process and observing generation of crimps, where O represented that no crumple was generated, while x represented that crimps were generated.

From the test results described above, it was confirmed that the synthetic resin leather according to the present invention is a novel synthetic resin leather which exhibits small difference in the elongations between in the longitudinal direction and the elongations in the transverse direction, had a predetermined thickness and good feeling, and further it was effective to carry out the sheet assembly process, and had good flame-retardancy. Among them, it was confirmed that the synthetic resin leather in Example 1 using the substrate 1 shown in FIG. 2 was particularly preferable.

On the contrary, it was confirmed that the synthetic resin leather of Comparative Example 1 which had the loops 6,6' made of the first yarns 1 arranged continuously in the transverse direction and on the front and rear sides of the substrate 1', and thus had poor flame-retardancy. The synthetic resin leather of Comparative Example 2 which was formed by using the substrate made of only the first yarns 3, had big difference in the elongations between in the longitudinal direction and in the transverse direction and a high stress against the elongation, thereby had reduced flexibility. The synthetic resin leather of Comparative Example 3 which was formed by using the substrate made of only the second yarns 4, had big difference in the elongations between in the longitudinal direction and in the transverse direction, exhibited seam extension, thus having no commercial value and being lack of the feeling due to insufficient thickness.

Even in the case where the raw materials for the first yarns 3 and the second yarns 4 were changed to other ones used in the present invention in the Examples and Comparative Examples, it was confirmed that the effects were substantially the same as in Table 1.

With respect to flame-retardancy, elongations in the longitudinal direction and in the transverse direction and an average thereof, and thickness in the case of using a soft polyvinyl chloride leather in the synthetic resin layer, the results were substantially the same as in Table 1.

Examples 4 to 6

With respect to Examples 1 to 3 as described above, a synthetic resin leather was produced by using NONNEN 109 available from Marubishi Oil Chemical Co., Ltd. (a nitrogen/phosphorous-based flame-retardant in which carbamate phosphate is dispersed in isopropyl alcohol/water) to form a substrate provided with flame-retardancy, laminating a synthetic resin layer with a phosphate ester-based flame-retardant incorporated on the substrate for integration. Examples 4 to 6 relate to the integrated synthetic resin leathers.

With respect to the synthetic resin leathers of Examples 4 to 6, evaluated was flame-retardancy by a combustion test according to JIS D 1201, wherein the leathers were used for the interior materials for cars. The result showed that the leathers had a combustion rate of less than 100 mm/min and clearly satisfied the flame-retardancy for the interior materials for cars.

In addition, it was confirmed that no substrate became hard and flexibility of the leathers was substantially identical to that of the leathers obtained in Examples 1 to 3.

Comparative Examples 4 to 6

With respect to Examples 1 to 3, a substrate with flame-retardancy was produced by using NONNEN RO23-4 available from Marubishi Oil Chemical Co., Ltd. (a phosphorous-based flame-retardant). Comparative Examples 4 to 6 related to the obtained substrates.

With respect to the synthetic resin leathers of Comparative Examples 4 to 6, evaluated was the flame-retardancy by a combustion test according to JIS D 1201, wherein the leathers were used for the interior materials for cars. The result showed that the leathers had the combustion rate equal to 100 mm/min or more and failed to clearly satisfy the flame-retardancy for the interior materials for cars.

Examples 7 to 14 and Comparative Example 7

To the substrate obtained in Example 1, applied were NONNEN 109 available from Marubishi Oil Chemical Co., Ltd. (a nitrogen/phosphorous-based flame-retardant in which carbamate phosphate is dispersed in isopropyl alcohol/water; Examples 7 to 14), or NONNEN RO23-4 available from Marubishi Oil Chemical Co., Ltd. (a phosphorous-based flame-retardant; Comparative Example 7) with a solid content of 35 g/m$^2$, following by heating and drying to obtain a substrate with flame-retardancy. With the obtained substrate, the resins and additives listed in Table 2 (numerical values mean composition ratio in parts by weight) were combined, and the combination was then subjected to calendering molding to form a sheet having thickness of 0.25 mm.

One side of the substrate after the flame-retarding process was coated with a urethane resin-based adhesive. Then, the above formed sheet was superposed over the coated side and adhered, followed by applying a polish regulator according to a typical method. Subsequently, the treated sheet was heated at 180° C. and pressed using a squeezing roll and a rubber roll at room temperature. As a result, the synthetic resin leather comprising the substrate and the resin sheet integrated together was produced. Both of flame-retardancy test and volatility loss test were conducted on the above obtained synthetic resin leather. The results are shown in Table 2. The flame-retardancy test was complied with JIS D 1201-1998 to examine a maximum value of the combustion rates (mm/min) n=10. In the case of the interior material of cars, it required a maximum value of 100 or less, and preferably 60 or less in consideration of deterioration thereof expected. The volatility loss test was to examine loss in weight (%) at exposure of specimen to atmosphere at 120° C. for 100 hours. It required the volatility loss equal to 5 or less for the interior material of cars.

TABLE 2

|  | Example | | | | | | | | Comparative Example |
|---|---|---|---|---|---|---|---|---|---|
|  | 7 | 8 | 9 | 10 | 11 | 12 | 13 | 14 | 7 |
| (Resin) | | | | | | | | | |
| Thermoplastic polyurethane (1) | 75 | 75 | 75 | 75 | 75 | | | | 75 |
| Thermoplastic polyurethane (2) | | | | | | 75 | | | |
| Thermoplastic polyurethane (3) | | | | | | | 75 | 75 | |
| Acrylic soft resin | 20 | 20 | 20 | 20 | 20 | 20 | 20 | 20 | 20 |
| Styrene-based rubber | 5 | 5 | 5 | 5 | 5 | 5 | 5 | 5 | 5 |
| Nylon resin | 5 | 5 | 5 | 5 | 5 | | | | 5 |
| (Plasticizer) | | | | | | | | | |
| Tricresyl phosphate | 15 | | | | | 10 | 15 | | 15 |
| Cresyl diphenyl phosphate | | | | | | | | | |
| Aromatic condensed phosphate ester | | | | | | | | 15 | |
| Dialkyl($C_{10}$~$C_{12}$) phthalate | | 15 | 10 | 10 | 10 | | | | |
| (additives) | | | | | | | | | |
| Calcium carbonate | 10 | 10 | 10 | 10 | 10 | 10 | 10 | 10 | 10 |
| Hydrazodicarbonamide | 40 | 40 | 40 | 30 | 20 | | | | 40 |
| Polymeric acrylic processing aid | 5 | 5 | 5 | 5 | 5 | 5 | 5 | 5 | 5 |
| Phenol-based antioxidant | 0.3 | 0.3 | 0.3 | 0.3 | 0.3 | 0.3 | 0.3 | 0.3 | 0.3 |
| Sodium perchlorate processing aid | 0.5 | 0.5 | 0.5 | 0.5 | 0.5 | 0.5 | 0.5 | 0.5 | 0.5 |
| Benzotriazole-based UV absorber | 0.7 | 0.7 | 0.7 | 0.7 | 0.7 | 0.7 | 0.7 | 0.7 | 0.7 |
| Hindered amine-based photostabilizer | 0.3 | 0.3 | 0.3 | 0.3 | 0.3 | 0.3 | 0.3 | 0.3 | 0.3 |
| Polyethylene wax processing aid | 0.5 | 0.5 | 0.5 | 0.5 | 0.5 | 0.5 | 0.5 | 0.5 | 0.5 |
| (Substrate treatment) | | | | | | | | | |
| Nitrogen/phosphorous-based treatment | Yes | Yes | Yes | Yes | Yes | Yes | Yes | Yes | |
| Phosphorous-based treatment | | | | | | | | | Yes |
| (Results of the test) | | | | | | | | | |
| Flame-retardancy test (JIS D1201) | 31 | 67 | 66 | 65 | 66 | 48 | 40 | 61 | 155 |
| Volatility loss | 4.5 | 0.3 | 0.3 | 0.4 | 0.3 | 3.8 | 4.5 | 0.6 | 4.3 |
| Shore A hardness of resin layer | 73 | 72 | 73 | 73 | 72 | 69 | 66 | 66 | 73 |

From the above Table 2, thermoplastic polyurethane (1) is UHE-75A10 available from Mitsubishi Chemical Co., Ltd. (using ether-based polyol as a raw material, Shore A hardness 75), thermoplastic polyurethane (2) is 2103-70A available from Dow Chemical Co., Ltd. (using ether-based polyol as a raw material, Shore A hardness 70), and thermoplastic polyurethane (3) is T-8375 available from Bayer Co., Ltd. (using ether-based polyol as a raw material, Shore A hardness 75). An acrylic soft resin is SA-1000P available from Kuraray Co., Ltd. (acrylic soft resin, Shore A hardness 70), styrene-based rubber is 8915X available from RIKEN TECHNO Co., Ltd. (a polar modified copolymer of polystyrene and polypropylene) and nylon resin is Amilan CM6541X3 available from Toray Co., Ltd. Lastly, aromatic condensed phosphate ester is CR-741 available from DAIHACHI Co., Ltd. (low volatile phosphate ester having a large molecular weight) and a polymeric acrylic processing aid is Metablen P-530 (a methyl methacrylate-alkyl acrylate copolymer) available from Mitsubishi Rayon Co., Ltd.

As shown in Table 2, all of the synthetic resin leathers obtained in Examples 7 to 14 exhibited high flexibility of the resin layer and gave excellent results from the flame-retardancy test and the volatility loss test.

Examples 15 to 21 and Comparative Examples 8 to 10

The Components listed in Table 3 were combined at room temperature, mixed under heating using a Banbury mixer at 160° C. for 5 minutes to carry out a dynamic cross-linking reaction. Then, the mixture was stocked on a warming roll not to lower the temperature and subjected to the calendering process at a roll temperature of 150° C. to obtain a sheet having a thickness of 0.25 mm. By laminating the obtained sheet and the substrate of Example 1 using an acrylic adhesive, and applying other treatments such as marble printing, coating treatment using a polish regulator and/or embossing process to obtain a synthetic resin leather. The substrate was formed by applying NONNEN 109 available from Marubishi Oil Chemical Co., Ltd. (a nitrogen/phosphorous-based flame-retardant in which carbamate phosphate is dispersed in isopropyl alcohol/water; Examples 7 to 14) to the substrate with a solid content of 35 g/m², following by drying.

As shown in Table 3, the thermoplastic polyurethane-based elastomer is T-8375N (Shore A hardness 75) available from DIC Bayer Polymer Ltd., the acrylic soft resin is SA1000P available from Kuraray Co., Ltd. (Shore A hardness 70), the styrene-based rubber is 8915X available from Riken Technos Co., Ltd., and the polyamide copolymer is CM-6541X3 (melting point 133° C.) available from Toray Co., Ltd. Also, the diisocyanate master batch comprises pellets composed of 30% by mass of methylene bis(4,1-phenylene)diisocyanate and 70% by mass of a butanediol terephthalate-polytetramethylene glycol copolymer. The hydrazodicarbonamide is KBH-30 available from Otsuka Chemical Co., Ltd., the calcium carbonate is NS-A available from Nitto Funka Kogyo K. K. and the polymeric acrylic processing aid is Metablen P-530A available from Mitsubishi Rayon Co., Ltd.

For the obtained synthetic resin leathers, calendering workability, abrasion-resistance, flame-retardancy and flexibility were examined and the results thereof are shown in Table 3.

TABLE 3

| | Example | | | | | | | Comparative example | | |
|---|---|---|---|---|---|---|---|---|---|---|
| | 15 | 16 | 17 | 18 | 19 | 20 | 21 | 8 | 9 | 10 |
| (1) Thermoplastic polyurethane-based elastomer | 75 | 75 | 75 | 80 | 100 | 100 | 75 | 75 | 100 | 75 |
| (2) Acrylic soft resin | 25 | 25 | 25 | | | | 25 | 25 | | 25 |
| (3) Styrene-based rubber | 5 | 5 | 5 | | | | 5 | 5 | | |
| (4) Polyamide copolymer | | | | 20 | | | | | | |
| (5) Diisocyanate master batch | 1.0 | 0.5 | 1.5 | 1.0 | 0.5 | 1.5 | 5.0 | | | 6.0 |
| (6) Plasticizer tricresyl phosphate | 10 | 10 | 10 | 10 | 10 | 10 | 10 | 10 | 10 | 10 |
| (7) Plasticizer diisodecyl phthalate | | | | | | | | | | |
| (8) Polyethylene wax processing aid | 0.5 | 0.5 | 0.5 | 0.5 | 0.5 | 0.5 | 0.5 | 0.5 | 0.5 | 0.5 |
| (9) Calcium carbonate | 10 | 10 | 10 | 10 | 10 | 10 | 10 | 10 | 10 | 10 |
| (10) Polymeric acrylic processing aid | 5 | | | | | | 5 | 5 | | |
| (11) Phenol-based antioxidant | 0.3 | 0.3 | 0.3 | 0.3 | 0.3 | 0.3 | 0.3 | 0.3 | 0.3 | 0.3 |
| (12) Sodium perchlorate processing aid | 0.5 | 0.5 | 0.5 | 0.5 | 0.5 | 0.5 | 0.5 | 0.5 | 0.5 | 0.5 |
| (13) Benzotriazole-based UV absorber | 0.7 | 0.7 | 0.7 | 0.7 | 0.7 | 0.7 | 0.7 | 0.7 | 0.7 | 0.7 |
| (14) Hindered amine-based photostabilizer | 0.3 | 0.3 | 0.3 | 0.3 | 0.3 | 0.3 | 0.3 | 0.3 | 0.3 | 0.3 |
| (15) Pigment | 2 | 2 | 2 | 2 | 2 | 2 | 2 | 2 | 2 | 2 |
| Diisocyanate/elastomer of (1) (parts by mass) | 0.4 | 0.2 | 0.6 | 0.37 | 0.15 | 0.45 | 2.0 | 0.0 | 0.0 | 2.4 |
| Calendering Workability | good | good | good | good | good | good | workable | good | good | Non-workable |
| Recyclability | recyclable | recyclable | recyclable | recyclable | recyclable | recyclable | non-recyclable | recyclable | recyclable | — |
| Abrasion-resistance | 140 | 100 | 190 | 228 | 92 | 116 | 225 | 61 | 63 | — |

TABLE 3-continued

|  | Example | | | | | | | Comparative example | | |
|---|---|---|---|---|---|---|---|---|---|---|
|  | 15 | 16 | 17 | 18 | 19 | 20 | 21 | 8 | 9 | 10 |
| Flame-retardancy | pass | pass | pass | pass | pass | pass | pass | pass | pass | — |
| Flexibility | good | good | good | slightly hard | slightly hard | slightly hard | good | good | slightly hard | — |

With respect to Table 3, the test methods and the evaluation methods for calendering workability, abrasion-resistance, flame-retardancy and flexibility were evaluated as follows:

Calendering Workability: "Good" means that calendering workability is good at a roll temperature of 150° C. "Non-workable" means that the leather is cured during the kneading process using a Banbury mixer, thus not being able to undergo the calendering process.

Abrasion-resistance: Using a JSPS-type abrasion tester as defined in JIS K6404-16 (1999), canvas cloth No. 6 defined in JIS L3102 (1978) was attached in the transverse direction. By applying a load of 1 kg to the canvas cloth, the counts (numbers) were measured until it became torn. If the counts are less than 80, the durability of the canvas cloth is insufficient to be employed on the seating surface of a seat.

Flame-retardancy: Evaluated according to JIS D 1201 (1998). "Pass" means that the combustion rate is less than 100 mm/min.

Flexibility: Sensory evaluation of the hardness of foamed urethane applied on the seating surface of a chair.

As shown in Table 3, the synthetic resin leathers of Examples 15 to 21 were suitable for a cover material of car seats. Particularly, in Examples 15 to 17, the flexibility is very preferable.

Examples 22 to 28 and Comparative Examples 11 to 13

As shown in Tables 4 and 5, the components represented in the columns for the foaming layers described in each of Examples and Comparative examples were combined together, were then heated and kneaded using a Banbury mixer at 160° C. for 5 minutes to carry out a dynamic cross-linking reaction. Then, the mixture was stocked on the warming roll not to lower the temperature and subjected to the calendering process at a roll temperature of 150° C. to obtain a sheet having a thickness of 0.2 mm. By laminating the obtained sheet and the substrate from Example 1 using an acrylic adhesive to obtain a laminate.

On the other hand, components represented in columns for the non-foaming layers described in respective Examples and Comparative examples as shown in Tables 4 and 5 were combined together at room temperature then mixed under heating using a Banbury mixer at 160° C. for 5 minutes to carry out the dynamic cross-linking reaction. However, for the mixtures in the non-foaming layers described in Example 23 and Comparative examples 11 and 12, the dynamic cross-linking reaction was not observed because the mixture had no diisocyanate master batch contained. Subsequently, the mixture was stocked on the warming roll not to fall down the temperature and subjected to the calendering process at a roll temperature of 150° C. to obtain a sheet having a thickness of 0.25 mm. After superposing the obtained sheet over the above sheet laminate, the foaming agent was activated by heating the superposed laminate at 215° C. Lastly, other treatments such as marble printing, coating treatment using polish-regulator and/or embossing process were conducted to the obtained material to result in the purposed synthetic resin leather.

Meanwhile, a substrate was formed by applying NONNEN 109 available from Marubishi Oil Chemical Co., Ltd. (a nitrogen/phosphorous-based flame-retardant in which carbamate phosphate is dispersed in isopropyl alcohol/water) to the substrate with a solid content of 35 g/m², following by drying.

As shown in Tables 4 and 5, the thermoplastic polyurethane-based elastomer is T-8375N (Shore A hardness 75) available from DIC Bayer Polymer Ltd., the acrylic soft resin is SA1000P available from Kuraray Co., Ltd. (Shore A hardness 70), the styrene-based rubber is 8915X available from Riken Technos Co., Ltd., and the polyamide copolymer is CM-6541X3 (melting point 133° C.) available from Toray Co., Ltd. Also, the diisocyanate master batch comprises pellets composed of 30% by mass of methylene bis(4,1-phenylene)diisocyanate and 70% by mass of a butanediol terephthalate-polytetramethylene glycol copolymer (Pandex AC-MASTER available from DIC Bayer Polymer Co., Ltd.). The hydrazodicarbonamide is KBH-30 available from Otsuka Chemical Co., Ltd., the calcium carbonate is NS-A available from Nitto Funka Kogyo K. K. and the polymeric acrylic processing aid is Metablen P-530A available from Mitsubishi Rayon Co., Ltd.

For the obtained synthetic resin leathers, calendering workability, abrasion-resistance, flame-retardancy, flexibility and foaming property were examined and the results thereof are shown in Table.

TABLE 4

| | Examples | | | | | | | | | | | |
|---|---|---|---|---|---|---|---|---|---|---|---|---|
| | 22 | | 23 | | 24 | | 25 | | 26 | | 27 | |
| | Foaming layer | Non foaming layer | Foaming layer | Non foaming layer | Foaming layer | Non foaming layer | Foaming layer | Non foaming layer | Foaming layer | Non foaming layer | Foaming layer | Non foaming layer |
| Thermoplastic polyurethane elastomer | 75 | 75 | 0 | 75 | 75 | 75 | 75 | 75 | 80 | 80 | 100 | 100 |
| Acrylic soft resin | 25 | 25 | 25 | 25 | 25 | 25 | 25 | 25 | | | | |
| Styrene-based rubber | 5 | 5 | 5 | 5 | 5 | 5 | 5 | 5 | | | | |

TABLE 4-continued

| | Examples | | | | | | | | | | | |
|---|---|---|---|---|---|---|---|---|---|---|---|---|
| | 22 | | 23 | | 24 | | 25 | | 26 | | 27 | |
| | Foaming layer | Non foaming layer | Foaming layer | Non foaming layer | Foaming layer | Non foaming layer | Foaming layer | Non foaming layer | Foaming layer | Non foaming layer | Foaming layer | Non foaming layer |
| Polyamide copolymer | | | | | | | | | 20 | 20 | | |
| Diisocyanate master batch | 1.0 | | 1.0 | 1.0 | 0.5 | 0.5 | 1.5 | 1.5 | 1.0 | 1.0 | 0.5 | 0.5 |
| Hydrazodicarbonamide | 40 | 40 | 40 | 40 | 40 | 40 | 40 | 40 | 40 | 40 | 40 | 40 |
| Plasticizer tricresyl phosphate | 15 | 15 | 15 | 15 | 15 | 15 | 15 | 15 | 15 | 15 | 15 | 15 |
| Plasticizer diisodecyl phthalate | | | | | | | | | | | | |
| Polyethylene wax processing aid | 0.5 | 0.5 | 0.5 | 0.5 | 0.5 | 0.5 | 0.5 | 0.5 | 0.5 | 0.5 | 0.5 | 0.5 |
| Calcium carbonate | 10 | 10 | 10 | 10 | 10 | 10 | 10 | 10 | 10 | 10 | 10 | 10 |
| Polymeric acrylic processing aid | 5 | 5 | 5 | 5 | | | | | | | | |
| Phenol-based antioxidant | 0.3 | 0.3 | 0.3 | 0.3 | 0.3 | 0.3 | 0.3 | 0.3 | 0.3 | 0.3 | 0.3 | 0.3 |
| Sodium perchlorate processing aid | 0.5 | 0.5 | 0.5 | 0.5 | 0.5 | 0.5 | 0.5 | 0.5 | 0.5 | 0.5 | 0.5 | 0.5 |
| Benzotriazole-based UV absorber | 0.7 | 0.7 | 0.7 | 0.7 | 0.7 | 0.7 | 0.7 | 0.7 | 0.7 | 0.7 | 0.7 | 0.7 |
| Hindered amine-based photostabilizer | 0.3 | 0.3 | 0.3 | 0.3 | 0.3 | 0.3 | 0.3 | 0.3 | 0.3 | 0.3 | 0.3 | 0.3 |
| Pigment | 2 | 2 | 2 | 2 | 2 | 2 | 2 | 2 | 2 | 2 | 2 | 2 |
| Azodicarbonamide (foaming agent) | 2 | | 2 | | 2 | | 2 | | 2 | | 2 | |
| Foaming aid | | | | | | | | | | | | |
| Calendering workability | good | good | good | good | good | good | Good | Good | Good | Good | Good | Good |
| Abrasion-resistance | 64 | | 140 | | 100 | | 190 | | 228 | | 92 | |
| Flame-retardancy | Pass | | Pass | | Pass | | Pass | | Pass | | Pass | |
| Flexibility | good | | good | | good | | good | | good | | good | |
| Foaming property | good | | good | | good | | good | | good | | good | |

TABLE 5

| | Example | | Comparative examples | | | | | |
|---|---|---|---|---|---|---|---|---|
| | 28 | | 11 | | 12 | | 13 | |
| | Foaming layer | Non foaming layer | Foaming layer | Non foaming layer | Foaming layer | Non foaming layer | Foaming layer | Non foaming layer |
| Thermoplastic polyurethane elastomer | 100 | 100 | 75 | 75 | 100 | 100 | 100 | 100 |
| Acrylic soft resin | | | 25 | 25 | | | | |
| Styrene-based rubber | | | 5 | 5 | | | | |
| Polyamide copolymer | | | | | | | | |
| Diisocyanate master batch | 1.5 | 1.5 | | | | | 2.5 | 2.5 |
| Hydrazodicarbonamide | 40 | 40 | 40 | 40 | 40 | 40 | 40 | 40 |
| Plasticizer tricresyl phosphate | 15 | 15 | 15 | 15 | 15 | 15 | 15 | 15 |
| Plasticizer diisodecyl phthalate | | | | | | | | |
| Polyethylene wax processing aid | 0.5 | 0.5 | 0.5 | 0.5 | 0.5 | 0.5 | 0.5 | 0.5 |
| Calcium carbonate | 10 | 10 | 10 | 10 | 10 | 10 | 10 | 10 |
| Polymeric acrylic processing aid | | | 5 | 5 | | | | |
| Phenol-based antioxidant | 0.3 | 0.3 | 0.3 | 0.3 | 0.3 | 0.3 | 0.3 | 0.3 |
| Sodium perchlorate processing aid | 0.5 | 0.5 | 0.5 | 0.5 | 0.5 | 0.5 | 0.5 | 0.5 |
| Benzotriazole-based UV absorber | 0.7 | 0.7 | 0.7 | 0.7 | 0.7 | 0.7 | 0.7 | 0.7 |
| Hindered amine based photostabilizer | 0.3 | 0.3 | 0.3 | 0.3 | 0.3 | 0.3 | 0.3 | 0.3 |

TABLE 5-continued

|  | Example 28 | | Comparative examples 11 | | 12 | | 13 | |
| --- | --- | --- | --- | --- | --- | --- | --- | --- |
|  | Foaming layer | Non foaming layer | Foaming layer | Non foaming layer | Foaming layer | Non foaming layer | Foaming layer | Non foaming layer |
| Pigment | 2 | 2 | 2 | 2 | 2 | 2 | 2 | 2 |
| Azodicarbonamide (foaming agent) | 2 | | 2 | | 2 | | 2 | |
| Foaming aid | | | | | | | | |
| Calendering workability | good | good | good | good | good | good | Non-workable | Non-workable |
| Abrasion-resistance | 116 | | 61 | | 63 | | | |
| Flame-retardancy | Pass | | Pass | | Pass | | | |
| Flexibility | slightly hard | | good | | slightly hard | | | |
| Foaming property | good | | poor due to rough cells | | poor due to rough cells | | | |

With respect to Tables 4 and 5, the test methods and the evaluation methods for calendering workability, abrasion-resistance, flame-retardancy, flexibility and foaming property were evaluated as follows:

Calendering Workability: Respectively evaluated for both of the foaming layer and the non-foaming layer. "Good" means that calendering workability is good at a roll temperature of 150° C. "Non-workable" means that the leather gets cured during the kneading process using a Banbury mixer not, thus not being able to undergo the calendering process.

Abrasion-resistance: Using a JSPS-type abrasion tester as defined in JIS K6404-16 (1999), canvas cloth No. 6 defined in JIS L3102 (1978) was attached in the transverse direction. By applying a load of 1 kg to the canvas cloth, the counts (numbers) were measured until it became torn. If the counts were less than 80, durability is insufficient for the canvas cloth to be employed on the seating surface of a chair.

Flame-retardancy: Evaluated according to JIS D 1201 (1998). "Pass" means that the combustion rate is less than 100 mm/min.

Flexibility: Sensory evaluation of the hardness of foamed urethane applied on the seating surface of a chair.

Foaming property: Microscopically observed the cross-section of the leather, visibly examined and evaluated the uniformity of cells.

The synthetic resin leathers of Examples 22 to 28 are suitable for the cover material of car seats. Particularly, in Examples 22 to 24, the flexibility is very preferable.

As described above, although various embodiments of the invention were described above with reference to the appended drawings, and Examples and Comparative Examples, it is apparent that the present invention is not intended to be limited to the Examples and Comparative Examples and that various modifications may be made without departing from the spirit and scope of the invention.

INDUSTRIAL AVAILABILITY

The present invention can provide a synthetic resin leather, which has small difference in the elongations between in the longitudinal direction and in the transverse direction, predetermined thickness, natural softness, flexibility and good feeling, by using a substrate composed of the fabric knitted on both sides prepared by cross-knitting a first yarns which is hardly stretchable but resilient and a second yarns which is easily stretchable. Further, the present invention can provide a novel synthetic resin leather, wherein by making loops made of the second yarns discontinuous in the longitudinal direction, the transverse direction and/or on front and rear sides of the substrate, the loop of the first yarns (yarns having a high-melting point) adjacent to the second yarns are carbonized to prevent melting and breaking thereof even where the loop of the second yarns are molten by ignition, etc., and thus the synthetic resin leather has flame-retardancy, and further good sewing-workability by inhibiting generation of crimps at the sheet assembly processing.

If the loops made of the first yarns and the loops made of the second yarns are formed to position alternately in the longitudinal direction, the transverse direction and/or on the front and rear sides of the substrate, the leather of the present invention can be practically more effective and suitable for use in related applications such as the interior materials for cars, the cover materials for car seats.

In addition, the synthetic resin layer laminated on the substrate includes various known synthetic materials used in production of the synthetic resin leather such as polyvinyl chloride or thermoplastic elastomer but is not limited thereto.

With the synthetic resin layer as described herein, the synthetic resin leather having good feeling, in addition to the above advantageous effects, can be provided.

With the synthetic resin layer as described herein, the synthetic resin leather having excellent abrasion-resistance and capable of being economically produced, in addition to the above advantageous effects, can be provided.

With the synthetic resin layer as described herein, the synthetic resin leather having excellent foaming property and abrasion-resistance, and capable of being economically produced, in addition to the above advantageous effects, can be provided.

As described herein, when the substrate undergoes the flame-retarding process using a nitrogen/phosphorous-based flame-retardant and the synthetic resin layer contains a phosphorous-based flame-retardant and/or a nitrogen/phosphorous-based flame-retardants, the synthetic resin leather can have practically more effective flame-retardancy effects.

What is claimed is:

1. A synthetic resin leather comprising a substrate and a synthetic resin layer attached to at least one side of the substrate, wherein the substrate has front and rear sides and is comprised of a both-sided knitted fabric having first and second yarns; the first yarn comprising cellulose-based single spun or mixed spun fibers and the second yarn being of 50 to 300 in denier and comprising crimpy long fiber filaments, thermoplastic elastomer long fiber filaments or polyurethane long fiber filaments; loops made of the first yarn and loops made of the second yarn are formed on the front and the rear sides of the substrate and are in alternating positions on the front side as compared to the rear side; and on each side of the substrate, loops of the first and second yarns are formed in alternating positions in longitudinal and transverse directions.

2. The synthetic resin leather according to claim 1, wherein a fiber number ratio of the first yarn to the second yarn is 1:1.

3. The synthetic resin leather according to claim 1 or 2, wherein the synthetic resin layer comprises a mixed resin layer composed of 50 to 95% by weight of thermoplastic polyurethane having Shore A hardness of 65 to 90 and 50 to 5% by weight of acrylic soft resin having Shore A hardness of 50 to 80, which has Shore A hardness of 60 to 80.

4. The synthetic resin leather according to claim 1 or 2, wherein the synthetic resin layer is a thermoplastic polyurethane-based elastomer layer which is prepared by blending polyisocyanate in thermoplastic polyurethane-based elastomer, mixing the blend under heating to obtain dynamically cross-linked thermoplastic polyurethane-based elastomer, then forming the obtained elastomer by calendering to prepare a sheet-like product.

5. The synthetic resin leather according to claim 4, further comprising blending methylenebis(4,1-phenylene)diisocyanate as polyisocyanate in an amount of 0.1 to 2 parts by mass based on 100 parts by mass of the thermoplastic polyurethane-based elastomer.

6. The synthetic resin leather according to claim 1 or 2, wherein the synthetic resin layer is formed by laminating a thermoplastic polyurethane-based elastomer foaming layer and a thermoplastic polyurethane-based elastomer non-foaming layer in this order; and the thermoplastic polyurethane-based elastomer foaming layer is prepared by blending polyisocyanate and a foaming agent in thermoplastic polyurethane-based elastomer, mixing the blend under heating to obtain dynamically cross-linked thermoplastic polyurethane-based elastomer, forming the obtained elastomer by calendering to prepare a sheet-like product, and further activating the foaming agent contained in the product to form a desired foaming layer.

7. The synthetic resin leather according to claim 6, wherein the thermoplastic polyurethane-based elastomer non-foaming layer is prepared by blending polyisocyanate in thermoplastic polyurethane-based elastomer, mixing the blend under heating to obtain dynamically cross-linked thermoplastic polyurethane-based elastomer, then forming the obtained elastomer by calendering to prepare a sheet-like product.

8. The synthetic resin leather according to claim 6, further comprising blending methylenebis(4,1-phenylene)diisocyanate as polyisocyanate in an amount of 0.1 to 2 parts by mass based on 100 parts by mass of the thermoplastic polyurethane-based elastomer.

9. The synthetic resin leather according to claim 1 or 2, wherein the substrate is subjected to a flame retarding process using a nitrogen/phosphorus-based flame retardant, and the synthetic resin layer further comprises at least one selected from a phosphate-based flame retardant and a nitrogen-based flame retardant.

10. The synthetic resin leather according to claim 7, further comprising blending methylenebis(4,1-phenylene)diisocyanate as polyisocyanate in an amount of 0.1 to 2 parts by mass based on 100 parts by mass of the thermoplastic polyurethane-based elastomer.

11. The synthetic resin leather according to claim 3, wherein the substrate is subjected to a flame retarding process using a nitrogen/phosphorus-based flame retardant, and the synthetic resin layer further comprises at least one selected from a phosphate-based flame retardant and a nitrogen-based flame retardant.

12. The synthetic resin leather according to claim 4, wherein the substrate is subjected to a flame retarding process using a nitrogen/phosphorus-based flame retardant, and the synthetic resin layer further comprises at least one selected from a phosphate-based flame retardant and a nitrogen-based flame retardant.

13. The synthetic resin leather according to claim 5, wherein the substrate is subjected to a flame retarding process using a nitrogen/phosphorus-based flame retardant, and the synthetic resin layer further comprises at least one selected from a phosphate-based flame retardant and a nitrogen-based flame retardant.

14. The synthetic resin leather according to claim 6, wherein the substrate is subjected to a flame retarding process using a nitrogen/phosphorus-based flame retardant, and the synthetic resin layer further comprises at least one selected from a phosphate-based flame retardant and a nitrogen-based flame retardant.

15. The synthetic resin leather according to claim 7, wherein the substrate is subjected to a flame retarding process using a nitrogen/phosphorus-based flame retardant, and the synthetic resin layer further comprises at least one selected from a phosphate-based flame retardant and a nitrogen-based flame retardant.

16. The synthetic resin leather according to claim 8, wherein the substrate is subjected to a flame retarding process using a nitrogen/phosphorus-based flame retardant, and the synthetic resin layer further comprises at least one selected from a phosphate-based flame retardant and a nitrogen-based flame retardant.

17. The synthetic resin leather according to claim 10, wherein the substrate is subjected to a flame retarding process using a nitrogen/phosphorus-based flame retardant, and the synthetic resin layer further comprises at least one selected from a phosphate-based flame retardant and a nitrogen-based flame retardant.

18. The synthetic resin leather according to claim 1, wherein the first yarn is of 10 to 40 in count.

* * * * *